US012775368B2

(12) United States Patent
Lee et al.

(10) Patent No.: US 12,775,368 B2
(45) Date of Patent: Oct. 27, 2026

(54) POSITION DETECTING DEVICE AND SENSOR

(71) Applicant: Wacom Co., Ltd., Saitama (JP)

(72) Inventors: Joo Hoon Lee, Saitama (JP); Hiroshi Mizuhashi, Saitama (JP); Fumitaka Goto, Saitama (JP); Hayato Kurasawa, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 19/432,675

(22) Filed: Dec. 24, 2025

(65) Prior Publication Data

US 2026/0160582 A1 Jun. 11, 2026

Related U.S. Application Data

(63) Continuation of application No. PCT/JP2024/022798, filed on Jun. 24, 2024.

(Continued)

(30) Foreign Application Priority Data

Dec. 4, 2023 (JP) ................................ 2023-204972

(51) Int. Cl.
*G01D 5/20* (2006.01)
*G06F 3/046* (2006.01)

(52) U.S. Cl.
CPC ............... *G01D 5/20* (2013.01); *G06F 3/046* (2013.01); *G06F 2203/04102* (2013.01); *G06F 2203/04106* (2013.01)

(58) Field of Classification Search
CPC ........... G06F 3/046; G06F 2203/04102; G06F 2203/04106; G01D 5/20
See application file for complete search history.

(56) References Cited

U.S. PATENT DOCUMENTS

| | | | |
|---|---|---|---|
| 9,639,220 B2 | 5/2017 | Wang | |
| 11,709,559 B2 | 7/2023 | Han et al. | |

(Continued)

FOREIGN PATENT DOCUMENTS

| | | |
|---|---|---|
| JP | 5094376 B2 | 12/2012 |
| JP | 2012252660 A | 12/2012 |

(Continued)

OTHER PUBLICATIONS

International Search Report, dated Sep. 3, 2024, for International Patent Application No. PCT/JP2024/022798. (9 pages) (with English translation).

(Continued)

*Primary Examiner* — Muhammad N Edun
(74) *Attorney, Agent, or Firm* — Seed Intellectual Property Law Group LLP

(57) ABSTRACT

Provided is a position detecting device for detecting a position of a pen on a panel surface by electromagnetic induction, the position detecting device including a display image generating layer that, in operation, generates a display image according to control of a driving circuit, a first electrode layer in which one or more first electrodes constituting a plurality of first coils arranged side by side in a first direction are arranged, and a second electrode layer in which one or more second electrodes constituting a plurality of second coils arranged side by side in a second direction intersecting the first direction are arranged, the second electrode layer being on an opposite side from a side provided with the first electrode layer with the display image generating layer as a center.

11 Claims, 25 Drawing Sheets

Related U.S. Application Data

(60) Provisional application No. 63/517,550, filed on Aug. 3, 2023, provisional application No. 63/510,440, filed on Jun. 27, 2023.

(56) References Cited

U.S. PATENT DOCUMENTS

| | | | |
|---|---|---|---|
| 12,321,557 | B2 | 6/2025 | Kim et al. |
| 12,411,575 | B2 | 9/2025 | Kim et al. |
| 12,493,372 | B2 | 12/2025 | Lu et al. |
| 2007/0085836 | A1 | 4/2007 | Ely |
| 2015/0160782 | A1 | 6/2015 | Park et al. |
| 2015/0185905 | A1 | 7/2015 | Ma et al. |
| 2016/0139701 | A1 | 5/2016 | Wang |
| 2016/0283033 | A1 | 9/2016 | Lee et al. |
| 2018/0114506 | A1* | 4/2018 | Takahashi ........... G06F 3/04166 |
| 2021/0208709 | A1 | 7/2021 | Shin et al. |
| 2022/0091632 | A1 | 3/2022 | Hong et al. |
| 2022/0187938 | A1 | 6/2022 | Han et al. |
| 2022/0253210 | A1* | 8/2022 | Onoda .................. G06F 1/3209 |
| 2023/0039953 | A1* | 2/2023 | Seger, Jr. ............ G06F 3/04886 |
| 2023/0067179 | A1 | 3/2023 | Kim et al. |
| 2023/0071229 | A1 | 3/2023 | Lee et al. |
| 2024/0160325 | A1 | 5/2024 | Kim et al. |
| 2024/0184382 | A1 | 6/2024 | Kim et al. |
| 2024/0192791 | A1 | 6/2024 | Ko et al. |
| 2024/0231532 | A1 | 7/2024 | Kim et al. |
| 2024/0338091 | A1 | 10/2024 | Lu et al. |
| 2025/0264946 | A1 | 8/2025 | Moon et al. |
| 2025/0355527 | A1 | 11/2025 | Mizuhashi et al. |
| 2026/0086689 | A1 | 3/2026 | Kurasawa et al. |
| 2026/0118999 | A1 | 4/2026 | Lee et al. |

FOREIGN PATENT DOCUMENTS

| | | | |
|---|---|---|---|
| JP | 2014021937 | A | 2/2014 |
| JP | 2014052995 | A | 3/2014 |
| JP | 2014164770 | A | 9/2014 |
| JP | 6246840 | B2 | 12/2017 |
| JP | 2017220187 | A | 12/2017 |
| JP | 2018185559 | A | 11/2018 |
| JP | 2019016283 | A | 1/2019 |
| JP | 2021033543 | A | 3/2021 |
| JP | 7212216 | B2 | 1/2023 |
| JP | 2023511974 | A | 3/2023 |
| JP | 2023051751 | A | 4/2023 |
| JP | 2023524325 | A | 6/2023 |
| JP | 7646101 | B1 | 3/2025 |
| JP | 7648857 | B1 | 3/2025 |
| WO | 2015083196 | A1 | 6/2015 |
| WO | 2022034765 | A1 | 2/2022 |

OTHER PUBLICATIONS

International Search Report, dated Sep. 10, 2024, for International Patent Application No. PCT/JP2024/022918. (9 pages) (with English translation).

Lee et al., "Position Detecting Device and Sensor," U.S. Appl. No. 19/432,729, filed Dec. 24, 2025.

Decision to Grant a Patent, mailed Feb. 4, 2025, for Japanese Patent Application No. JP 2024-558403. (with English translation) (5 pages).

Decision to Grant a Patent, mailed Feb. 4, 2025, for Japanese Patent Application No. JP 2024-558404. (with English translation) (5 pages).

Notice of Reasons for Refusal, mailed Jan. 28, 2025, for Japanese Patent Application No. 2024-558403. (with English translation) (7 pages).

Notice of Reasons for Refusal, mailed Jan. 28, 2025, for Japanese Patent Application No. 2024-558404. (with English translation) (4 pages).

Written Amendment, dated Jan. 28, 2025, for Japanese Patent Application No. JP 2024-558403. (with English translation) (4 pages).

Written Amendment, dated Jan. 28, 2025, for Japanese Patent Application No. JP 2024-558404. (with English translation) (11 pages).

* cited by examiner

| | R0 | R1 | R2 | R3 | R4 |
|---|---|---|---|---|---|
| T0 | 19 | 22 | 34 | 37 | 44 |
| T1 | 33 | 105 | 118 | 101 | 120 |
| T2 | 25 | 110 | 249 | 187 | 99 |
| T3 | 38 | 122 | 192 | 208 | 144 |
| T4 | 40 | 123 | 107 | 168 | 100 |

| | R0 | R1 | R2 | R3 | R4 |
|---|---|---|---|---|---|
| T0 | 19 | 22 | 34 | 37 | 44 |
| T1 | 33 | 105 | 118 | 101 | 120 |
| T2 | 25 | 110 | 249 | 187 | 99 |
| T3 | 38 | 122 | 192 | 208 | 144 |
| T4 | 40 | 123 | 107 | 168 | 100 |

POSITION DETECTING DEVICE AND SENSOR

BACKGROUND

Technical Field

The present disclosure relates to a position detecting device and a sensor, and particularly relates to a position detecting device and a sensor that detect the position of a pen by an electromagnetic induction system (electro-magnetic resonance (EMR) system).

Description of the Related Art

The EMR system is known as one of systems for detecting a position of an electromagnetic induction pen on a panel surface of a tablet terminal or the like. A position detecting device using the EMR system includes an EMR sensor including X-coils arranged in an X-direction and Y-coils arranged in a Y-direction, and is configured to derive the position of the electromagnetic induction pen by electromagnetic induction action between the EMR sensor and the electromagnetic induction pen. Japanese Patent Laid-open No. 2021-033543 discloses an example of the EMR sensor. As disclosed in this document, the EMR sensor is generally disposed on a lower side of a display (side distant from the panel surface). In addition, a touch sensor for detecting the position of a finger on the panel surface is disposed on an upper side of the display (side close to the panel surface).

In addition, a folding type display (foldable display) has recently appeared. U.S. Patent Application Publication No. 2023-0071229 and U.S. Patent Application Publication No. 2021-0208709 disclose examples of the foldable display.

Now, in a case where the foldable displays as disclosed in U.S. Patent Application Publication No. 2023-0071229 and U.S. Patent Application Publication No. 2021-0208709 are made to support the position detection of the electromagnetic induction pen by the EMR system, the EMR sensor also needs to be configured to be foldable. However, the external EMR sensor (as viewed from the display) as described in Japanese Patent Laid-open No. 2021-033543 cannot meet such a demand. This is because it is difficult to precisely position wiring within the EMR sensor manufactured in a different process from the display with respect to a folding axis of the display.

BRIEF SUMMARY

Hence, it is one of objects of the present disclosure to provide a position detecting device and a sensor that include a foldable display and support position detection of an electromagnetic induction pen by the EMR system.

In addition, in the conventional EMR sensor, the X-coils and the Y-coils both have parts where wires overlap each other between adjacent coils. That is, the X-coils and the Y-coils both have a multilayer structure, and correspondingly increase the thickness of a structural body including the EMR sensor and the display. Thus, there has been a need for improvement.

It is accordingly another one of the objects of the present disclosure to provide a position detecting device and a sensor that can realize a reduction in thickness of a structural body including an EMR sensor.

A position detecting device according to a first aspect of the present disclosure is a position detecting device for detecting a position of a pen on a panel surface by electromagnetic induction, the position detecting device including a display image generating layer that, in operation, generates a display image according to control of a driving circuit, a first electrode layer in which one or more first electrodes constituting a plurality of first coils arranged side by side in a first direction are arranged, and a second electrode layer in which one or more second electrodes constituting a plurality of second coils arranged side by side in a second direction intersecting the first direction are arranged, the second electrode layer being on an opposite side from a side provided with the first electrode layer with the display image generating layer as a center.

A position detecting device according to a second aspect of the present disclosure is a position detecting device for detecting a position of a pen on a panel surface by electromagnetic induction, the position detecting device including a display image generating layer that, in operation, generates a display image according to control of a driving circuit, a first electrode layer in which one or more first electrodes constituting a plurality of first coils arranged side by side in a first direction are arranged, and a second electrode layer in which one or more second electrodes constituting a plurality of second coils arranged side by side in a second direction intersecting the first direction are arranged, the one or more second electrodes being formed in one layer on one surface of the display image generating layer.

A position detecting device according to a third aspect of the present disclosure is a position detecting device for detecting a position of a pen on a panel surface by electromagnetic induction, the position detecting device including a display image generating layer that, in operation, generates a display image according to control of a driving circuit, a first electrode layer in which one or more first electrodes constituting a plurality of first coils arranged side by side in a first direction are arranged, a second electrode layer in which one or more second electrodes constituting a plurality of second coils arranged side by side in a second direction intersecting the first direction are arranged, and a support plate disposed at a position more distant from the panel surface than the display image generating layer, the one or more first electrodes being formed on the support plate.

A position detecting device according to a fourth aspect of the present disclosure is a position detecting device for detecting positions of a pen and a finger on a panel surface, the position detecting device including a display image generating layer that, in operation, generates a display image according to control of a driving circuit, and a plurality of coil-shaped electrodes arranged between the panel surface and the display image generating layer, the plurality of coil-shaped electrodes each having a configuration formed by connecting respective first ends of two conductors extended in parallel with each other along a first direction to each other by a connecting wire extending in a second direction intersecting the first direction, and a conductor extended so as to be stretched in a region displaying the display image as viewed in plan view among the two conductors constituting each of the plurality of coil-shaped electrodes being formed by a mesh electrode or a transparent electrode.

A sensor according to a first aspect of the present disclosure is a sensor for use in conjunction with an electronic apparatus that detects a position of a pen on a panel surface by electromagnetic induction, the electronic apparatus including a display image generating layer that, in operation, generates a display image according to control of a driving circuit, the sensor including a first electrode layer in which one or more first electrodes constituting a plurality of first coils arranged side by side in a first direction are arranged, and a second electrode layer in which one or more second electrodes constituting a plurality of second coils arranged side by side in a second direction intersecting the first direction are arranged, the second electrode layer being on an opposite side from a side provided with the first electrode layer with the display image generating layer as a center.

A sensor according to a second aspect of the present disclosure is a sensor for use in conjunction with an electronic apparatus that detects a position of a pen on a panel surface by electromagnetic induction, the electronic apparatus including a display image generating layer that, in operation, generates a display image according to control of a driving circuit, the sensor including a first electrode layer in which one or more first electrodes constituting a plurality of first coils arranged side by side in a first direction are arranged, and a second electrode layer in which one or more second electrodes constituting a plurality of second coils arranged side by side in a second direction intersecting the first direction are arranged, the one or more second electrodes being formed in one layer on one surface of the display image generating layer.

A sensor according to a third aspect of the present disclosure is a sensor for use in conjunction with an electronic apparatus that detects a position of a pen on a panel surface by electromagnetic induction, the electronic apparatus including a display image generating layer that, in operation, generates a display image according to control of a driving circuit, and a support plate disposed at a position more distant from the panel surface than the display image generating layer, the sensor including a first electrode layer in which one or more first electrodes constituting a plurality of first coils arranged side by side in a first direction are arranged, and a second electrode layer in which one or more second electrodes constituting a plurality of second coils arranged side by side in a second direction intersecting the first direction are arranged, the one or more first electrodes being formed on the support plate.

A sensor according to a fourth aspect of the present disclosure is a sensor for use in conjunction with an electronic apparatus that detects positions of a pen and a finger on a panel surface, the electronic apparatus including a display image generating layer that, in operation, generates a display image according to control of a driving circuit, the sensor including a plurality of coil-shaped electrodes arranged between the panel surface and the display image generating layer, the plurality of coil-shaped electrodes each having a configuration formed by connecting respective first ends of two conductors extended in parallel with each other along a first direction to each other by a connecting wire extending in a second direction intersecting the first direction, and a conductor extended so as to be stretched in a region displaying the display image as viewed in plan view among the two conductors constituting each of the plurality of coil-shaped electrodes being formed by a mesh electrode or a transparent electrode.

According to the first to fourth aspects of the present disclosure, it is possible to provide a position detecting device and a sensor that can realize a reduction in thickness of a structural body including an EMR sensor.

DETAILED DESCRIPTION

Embodiments of the present disclosure will hereinafter be described in detail with reference to the accompanying drawings.

Figure 1:
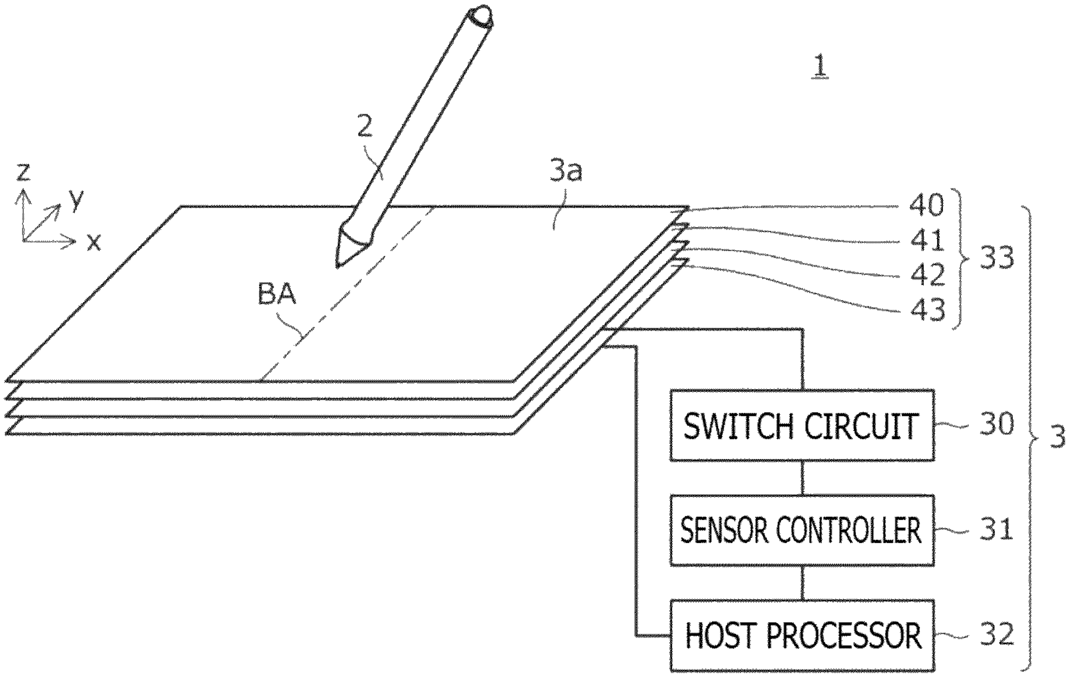
FIG. 1 is a diagram illustrating a configuration of a position detection system according to a first embodiment of the present disclosure.

FIG. 1 is a diagram illustrating a configuration of a position detection system 1 according to a first embodiment of the present disclosure. As illustrated in the figure, the position detection system 1 includes an electromagnetic induction pen 2 and a position detecting device 3. Of these, the electromagnetic induction pen 2 is a pen supporting position detection by an EMR system, and internally includes a resonance circuit including a coil and a capacitor. The EMR system is a system for deriving the position of the electromagnetic induction pen 2 through electromagnetic induction between an EMR sensor 42 to be described later and the electromagnetic induction pen 2, and includes both a system in which alternating magnetic fields are bidirectionally exchanged between the EMR sensor 42 and the electromagnetic induction pen 2 and a system in which an alternating magnetic field is unidirectionally sent out from the electromagnetic induction pen 2 to the EMR sensor 42. In the present embodiment, the description will be continued by taking an example in which alternating magnetic fields are bidirectionally exchanged between the EMR sensor 42 and the electromagnetic induction pen 2.

The position detecting device 3 is a computer (electronic apparatus) that supports pen input by the EMR system and touch input by a capacitive system. The position detecting device 3 includes a switch circuit 30, a sensor controller 31, a host processor 32, and a structural body 33. The structural body 33 includes a cover film 40, a touch sensor 41, the EMR sensor 42, and a display 43. Incidentally, arrangement order of the cover film 40, the touch sensor 41, the EMR sensor 42, and the display 43 illustrated in FIG. 1 is for convenience, and an actual arrangement thereof will be described later with reference to FIG. 5. In a typical example, the position detecting device 3 is a tablet terminal or a notebook personal computer that supports pen input and touch input.

Figure 18:
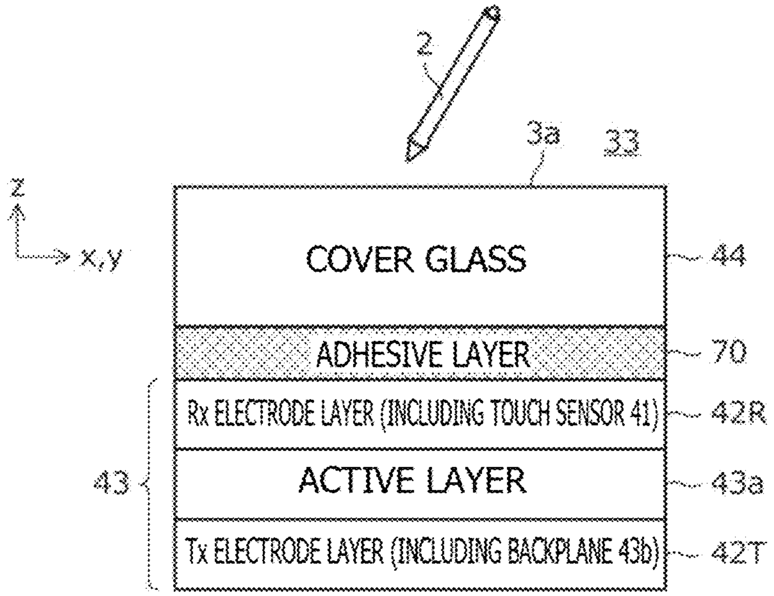
FIG. 18 is a diagram illustrating a layered structure of the structural body included in a position detecting device according to a third embodiment of the present disclosure.

First, directing attention to the structural body 33, the cover film 40 is a film-shaped member for protecting an internal structure of the structural body 33, and is formed by polyethylene terephthalate, for example. A cover glass as illustrated in FIG. 18 below is not used as a member for protecting the internal structure of the structural body 33 in order to enable bending at a folding axis BA illustrated in the figure. The structural body 33 is configured to be able to be valley-folded at the folding axis BA. Hence, the display 43 is a foldable display. The kind of display system of the display 43 is not particularly limited, and may be a liquid crystal display or an organic electroluminescence (EL) display.

The top surface of the cover film 40 is flat, and constitutes a panel surface 3*a* that serves also as the touch surfaces of the touch sensor 41 and the EMR sensor 42 and the display surface of the display 43. A user of the position detecting device 3 performs a pen input by sliding a pen tip of the electromagnetic induction pen 2 on the panel surface 3*a*, and performs a touch input by sliding an own finger.

The touch sensor 41 is a sensor including a plurality of Tx electrodes, which are linear electrodes each extending in an x-direction and juxtaposed to each other in a y-direction, and a plurality of Rx electrodes, which are linear electrodes each extending in the y-direction and juxtaposed to each other in the x-direction. Each of the plurality of Tx electrodes and each of the plurality of Rx electrodes are connected to the sensor controller 31 via the switch circuit 30. In addition, the EMR sensor 42 is a sensor including a plurality of Tx coils and a plurality of Rx coils. As will be described later in detail with reference to FIGS. 6 to 8, in the present embodiment, the plurality of Tx coils are formed by one comb-shaped coil (Tx electrodes), and the plurality of Rx coils are used also as the plurality of Rx electrodes of the touch sensor 41. Each of the plurality of Tx coils and each of the plurality of Rx coils are connected to the sensor controller 31 via the switch circuit 30.

The switch circuit 30 is an integrated circuit including a switch group provided between the sensor controller 31 and the electrodes (including the coils) within the touch sensor 41 and the EMR sensor 42. The switching of the switch group constituting the switch circuit 30 is performed by the sensor controller 31. Details of the switch circuit 30 will be described later in detail with reference to FIG. 7 and FIG. 8.

The sensor controller 31 is an integrated circuit that has a function of deriving the position of the finger within the panel surface 3*a* by using the touch sensor 41 and a function of deriving the position of the electromagnetic induction pen 2 within the panel surface 3*a* by using the EMR sensor 42. As for the electromagnetic induction pen 2, the sensor controller 31 is configured to have also a function of receiving data transmitted by the electromagnetic induction pen 2. The position derived by the sensor controller 31 and the data received by the sensor controller 31 are sequentially supplied to the host processor 32.

Making a brief description of processing performed by the sensor controller 31, first, as for the position of the finger, the sensor controller 31 transmits a predetermined touch detection signal from each of the plurality of Tx electrodes, and receives the touch detection signal by each of the plurality of Rx electrodes. The sensor controller 31 thereby obtains the strength of the received touch detection signal at each of points of intersection of the plurality of Rx electrodes and the plurality of Tx electrodes. The sensor controller 31 then derives the position of the finger within the panel surface 3*a* on the basis of a distribution of the obtained strength.

Next, as for the position of the electromagnetic induction pen 2, the sensor controller 31 sequentially supplies an alternating current to the plurality of Tx coils. An alternating magnetic field is sent out from the Tx coils supplied with the alternating current. When the coil constituting the resonance circuit of the electromagnetic induction pen 2 enters the inside of the alternating magnetic field, an electromotive force occurs across the coil, and the capacitor constituting the resonance circuit together with the coil is charged. When the sensor controller 31 thereafter stops the supply of the alternating current, an alternating magnetic field is sent out from the coil of the electromagnetic induction pen 2 (which alternating magnetic field will hereinafter be referred to as a "pen alternating magnetic field") due to electric power stored in the capacitor. The sensor controller 31 receives a signal generated in each Rx coil by the pen alternating magnetic field (which signal will hereinafter be referred to as a "pen signal"), and obtains the strength of the signal. The sensor controller 31 thereby derives the position of the electromagnetic induction pen 2 within the panel surface 3*a*. This processing will be described later again in detail with reference to FIGS. 2 to 4.

Finally, as for the data transmitted by the electromagnetic induction pen 2, the transmission target data can include a pen pressure value indicating a pressure applied to the pen tip, on/off information indicating the state of a switch provided to the surface of a casing, a pen ID stored in a built-in memory, and the like. The electromagnetic induction pen 2 is configured such that the resonance frequency of the resonance circuit changes according to the contents of these pieces of data. When the resonance frequency of the resonance circuit changes, the frequency of the pen signal received by the sensor controller 31 also changes. The sensor controller 31 detects the change in this frequency by demodulating the received pen signal. The sensor controller 31 thereby receives the data transmitted by the electromagnetic induction pen 2.

The host processor 32 is a central processing unit of the position detecting device 3. The host processor 32 plays a role of executing an operating system of the position detecting device 3 and various kinds of applications by executing a program read from a memory not illustrated. Processing performed by the host processor 32 according to the program includes processing of generating a video signal and supplying the video signal to the display 43, various kinds of processing performed by using the position and the data supplied from the sensor controller 31, and the like. The various kinds of processing performed by using the position and the data includes, for example, movement of a cursor displayed on the display surface, generation of stroke data indicating the trajectory of the electromagnetic induction pen 2 within the touch surface, and the like. As for the stroke data in the above, the host processor 32 performs also processing of rendering and displaying the generated stroke data, processing of generating and recording digital ink including the generated stroke data, processing of transmitting the generated digital ink to an external device according to an instruction of the user, and the like.

Figure 2:
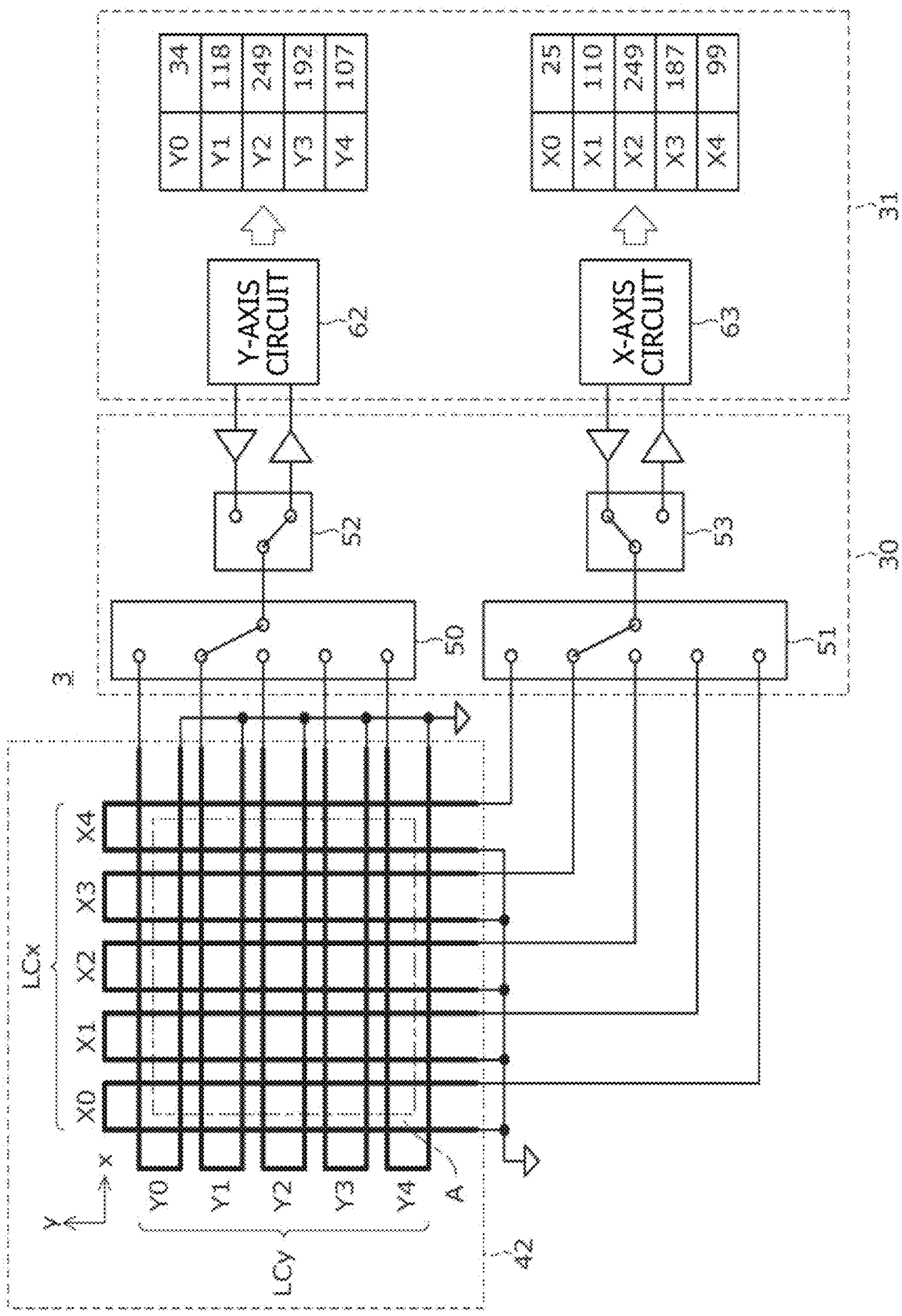
FIG. 2 is a diagram of assistance in explaining principles of deriving a position of an electromagnetic induction pen.
Figure 3:
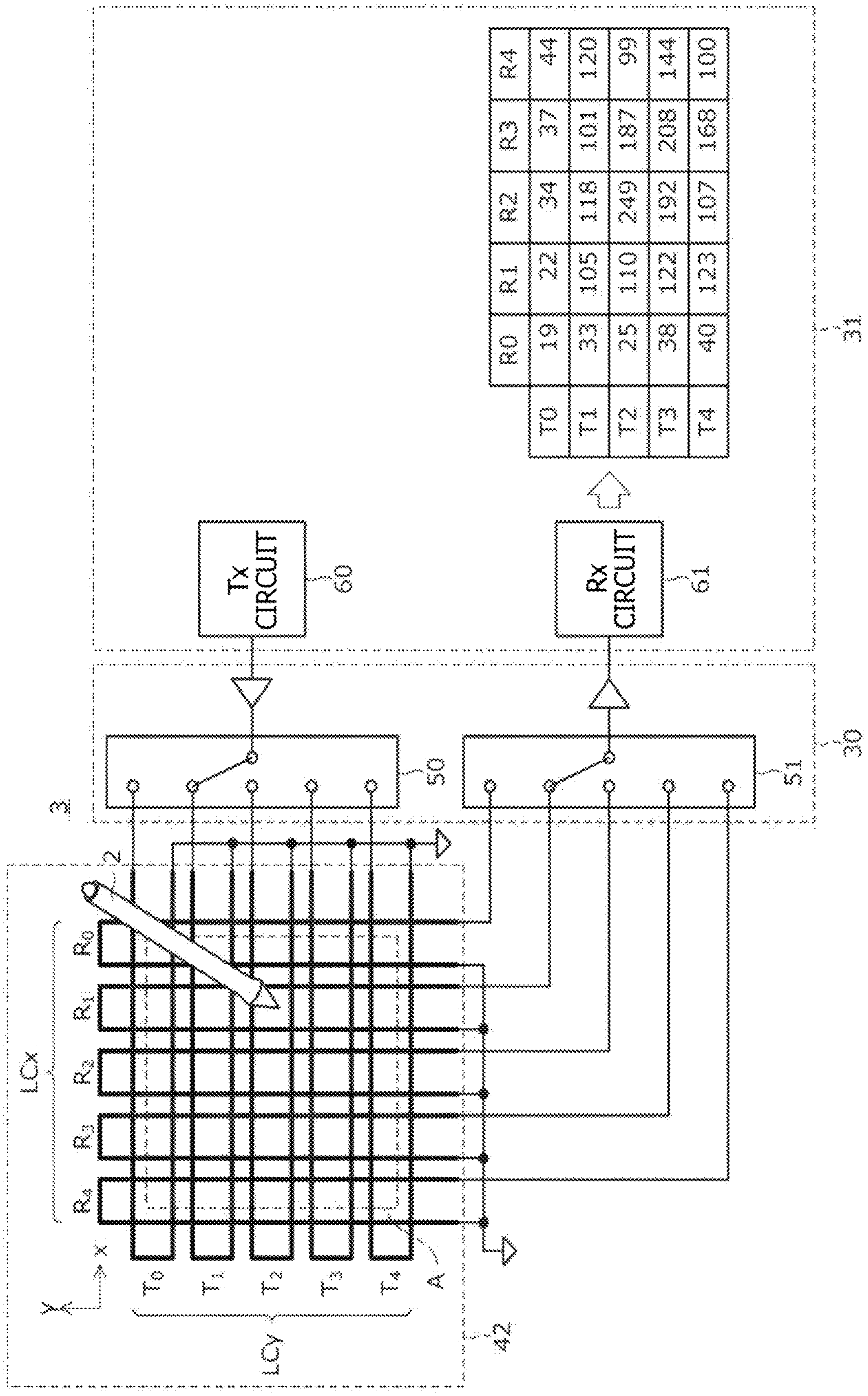
FIG. 3 is a diagram of assistance in explaining principles of deriving a position of the electromagnetic induction pen.
Figure 4:
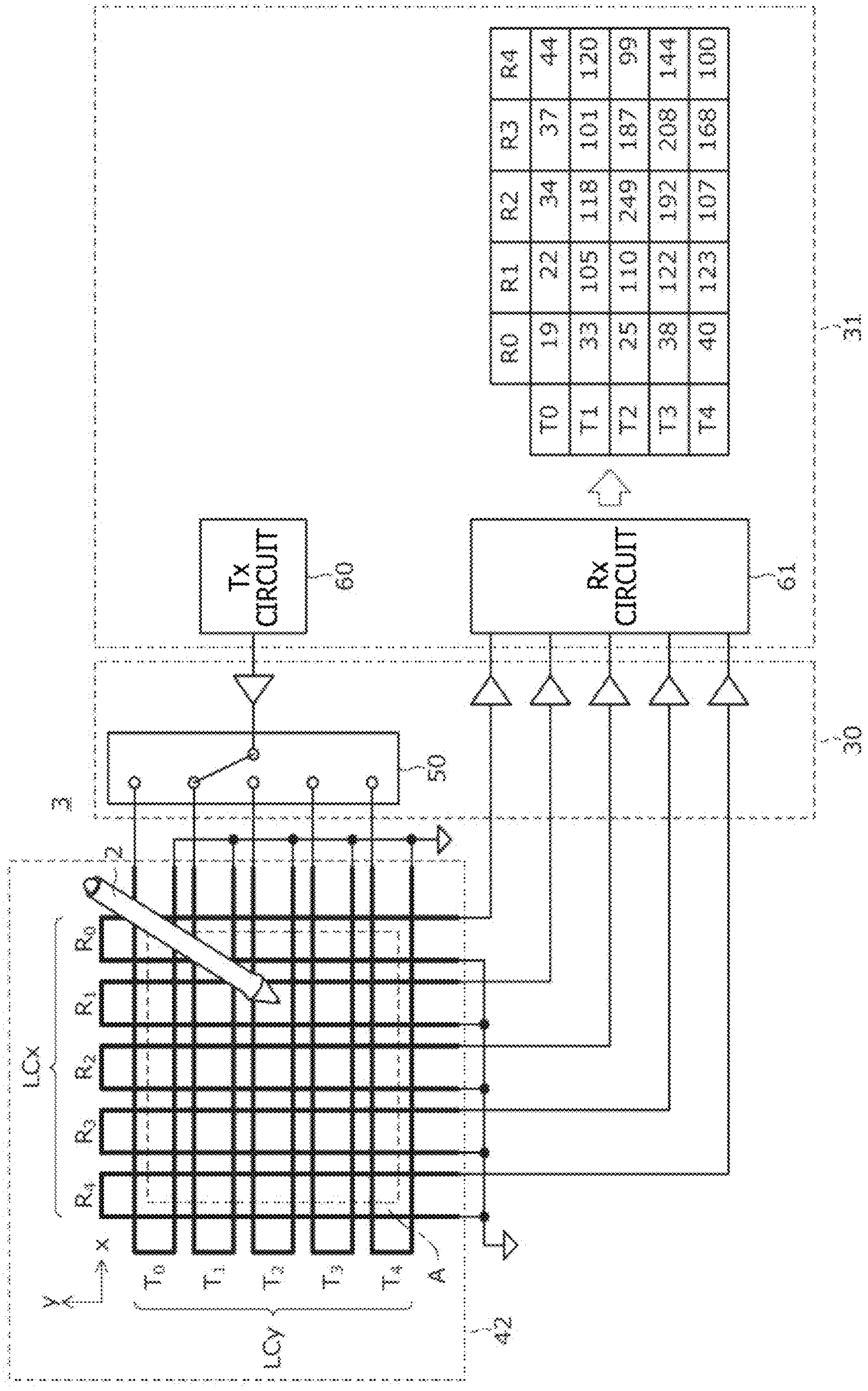
FIG. 4 is a diagram of assistance in explaining principles of deriving a position of the electromagnetic induction pen.

FIGS. 2 to 4 are each a diagram of assistance in explaining principles of deriving the position of the electromagnetic induction pen 2. These are diagrams of assistance in explaining the principles, and do not necessarily match the configuration of the switch circuit 30, the sensor controller 31, and the EMR sensor 42 according to the present embodiment. In the following, the principles of deriving the position of the electromagnetic induction pen 2 will be described in detail with reference to these figures.

Here, a plurality of loop coils LCx illustrated in FIGS. 2 to 4 are each a coil extending in the y-direction and arranged side by side in the x-direction, and a plurality of loop coils LCy are each a coil extending in the x-direction and arranged side by side in the y-direction. In the example of FIG. 2, the loop coils LCx and LCy each correspond to both an Rx coil and a Tx coil described above. In the examples of FIG. 3 and FIG. 4, on the other hand, the loop coils LCx correspond to the Rx coils, and the loop coils LCy correspond to the Tx coils. Incidentally, while each of the figures illustrates only five loop coils LCx and five loop coils LCy for the simplicity of description, an actual EMR sensor 42 generally has more loop coils LCx and LCy. In addition, in each of the figures, the position of an active area A, which is a display region of the display 43 (region displaying a display image), is indicated by a broken line.

Referring first to FIG. 2, the switch circuit 30 according to the present example includes switches 50 to 53, and the sensor controller 31 includes a Y-axis circuit 62 and an X-axis circuit 63.

The switch 50 is a single-pole multiple-throw switch including a plurality of selection terminals respectively connected to first ends of the respective loop coils LCy and a common terminal connected to a common terminal of the switch 52. Second ends of the respective loop coils LCy are grounded. The switch 52 is a single-pole double-throw switch including a selection terminal connected to an output terminal of the Y-axis circuit 62 via a buffer, a selection terminal connected to an input terminal of the Y-axis circuit 62 via a buffer, and the common terminal connected to the common terminal of the switch 50.

In addition, the switch 51 is a single-pole multiple-throw switch including a plurality of selection terminals respectively connected to first ends of the respective loop coils LCx and a common terminal connected to a common terminal of the switch 53. Second ends of the respective loop coils LCx are grounded. The switch 53 is a single-pole double-throw switch including a selection terminal connected to an output terminal of the X-axis circuit 63 via a buffer, a selection terminal connected to an input terminal of the X-axis circuit 63 via a buffer, and the common terminal connected to the common terminal of the switch 51.

First, as illustrated in FIG. 2, the sensor controller 31 according to the example of FIG. 2 switches the switch 52 to the input terminal side of the Y-axis circuit 62, switches the switch 53 to the output terminal side of the X-axis circuit 63, and switches the switch 51 to the side of one loop coil LCx. The sensor controller 31 next starts to output an alternating current from the X-axis circuit 63. Thus, an alternating magnetic field is sent out from the loop coil LCx connected to the X-axis circuit 63, and the loop coil LCx functions as a Tx coil. After the passage of a predetermined time from the start of the output, the sensor controller 31 stops the output of the alternating current, and controls the switch 50 such that one loop coil LCy is connected to the input terminal of the Y-axis circuit 62. Then, the strength of the pen signal input to the Y-axis circuit 62 (strength of the pen alternating magnetic field) is obtained in that state. Thus, the loop coil LCy connected to the Y-axis circuit 62 functions as an Rx coil. The sensor controller 31 obtains the strength of the pen signal in each loop coil LCy by performing the series of processing from the output of the alternating current to the obtainment of the strength of the pen signal as described above for each loop coil LCy. A table illustrated next to the Y-axis circuit 62 in FIG. 2 represents an example of the thus obtained strength of the pen signal. The sensor controller 31 derives the Y-coordinate of the electromagnetic induction pen 2 on the basis of a distribution of the obtained strength in the Y-direction.

The sensor controller 31 next performs processing similar to the foregoing with X and Y interchanged. Specifically, the switch 53 is switched to the input terminal side of the X-axis circuit 63, the switch 52 is switched to the output terminal side of the Y-axis circuit 62, and the switch 50 is switched to the side of one loop coil LCy. The sensor controller 31 next starts to output an alternating current from the Y-axis circuit 62. After the passage of a predetermined time from the start of the output, the sensor controller 31 stops the output of the alternating current, and controls the switch 51 such that one loop coil LCx is connected to the input terminal of the X-axis circuit 63. Then, the strength of the pen signal input to the X-axis circuit 63 is obtained in that state. The sensor controller 31 obtains the strength of the pen signal in each loop coil LCx by performing the series of processing from the output of the alternating current to the obtainment of the strength of the pen signal as described above for each loop coil LCx. A table illustrated next to the X-axis circuit 63 in FIG. 2 represents an example of the thus obtained strength of the pen signal. The sensor controller 31 derives the X-coordinate of the electromagnetic induction pen 2 on the basis of a distribution of the obtained strength in the X-direction.

As described above, the sensor controller 31 according to the example of FIG. 2 individually obtains each of the X-coordinate and the Y-coordinate on the basis of the respective distributions in the X-direction and the Y-direction. The sensor controller 31 is configured to then derive the position of the electromagnetic induction pen 2 by combining the two obtained coordinates.

Referring next to FIG. 3, the present example is different from the example illustrated in FIG. 2 in that the switch circuit 30 does not include the switches 52 and 53 and in that the sensor controller 31 includes a Tx circuit 60 and an Rx circuit 61 in place of the Y-axis circuit 62 and the X-axis circuit 63.

The switch 50 is similar to the switch 50 according to the example of FIG. 2 except that the common terminal is connected to an output terminal of the Tx circuit 60 via a buffer. The switch 51 is also similar to the switch 51 according to the example of FIG. 2 except that the common terminal is connected to an input terminal of the Rx circuit 61 via a buffer. The second ends of each of the loop coils LCy and each of the loop coils LCx are grounded as in the example of FIG. 2.

The sensor controller 31 according to the example of FIG. 3 starts to output an alternating current from the Tx circuit 60 in a state in which the switch 50 is switched to the side of one loop coil LCy. Thus, an alternating magnetic field is sent out from the loop coil LCy connected to the Tx circuit 60, and the loop coil LCy functions as a Tx coil. After the passage of a predetermined time from the start of the output, the sensor controller 31 stops the output of the alternating current, and controls the switch 51 such that one loop coil LCy is connected to the Rx circuit 61. Then, the strength of the pen signal input to the Rx circuit 61 (strength of the pen alternating magnetic field) is obtained in that state. Thus, the loop coil LCx connected to the Rx circuit 61 functions as an Rx coil. The sensor controller 31 obtains the strength of the pen signal at each of points of intersection of the loop coils LCy and the loop coils LCx by performing this processing for all of combinations of the loop coils LCy and LCx. A table illustrated next to the Rx circuit 61 in FIG. 3 represents an example of the thus obtained strength of the pen signal. The sensor controller 31 is configured to derive the position of the electromagnetic induction pen 2 on the basis of a two-dimensional distribution of the obtained strength of the pen signal.

Referring next to FIG. 4, the switch circuit 30 according to the present example is different from the switch circuit 30 illustrated in FIG. 3 in that the switch circuit 30 according to the present example does not include the switch 51. First end of each loop coil LCx is connected to the input terminal of the Rx circuit 61 without the intervention of the switch 51. Though not illustrated in the figure, the Rx circuit 61 according to the example of FIG. 4 includes receiving circuits equal in number to the loop coils LCx.

Processing performed by the sensor controller 31 according to the example of FIG. 4 is basically similar to the processing performed by the sensor controller 31 according to the example of FIG. 3, but is different from the processing performed by the sensor controller 31 according to the example of FIG. 3 in that the strength of the pen signal input to the Rx circuit 61 via each of the loop coils LCx is obtained simultaneously after the alternating magnetic field is sent out from the loop coil LCy. The sensor controller 31 obtains the strength of the pen signal (strength of the pen alternating magnetic field) at each of the points of intersection of the loop coils LCy and the loop coils LCx by performing this processing for each loop coil LCy. A table illustrated next to the Rx circuit 61 in FIG. 4 represents an example of the thus obtained strength of the pen signal. The sensor controller 31 is configured to derive the position of the electromagnetic induction pen 2 on the basis of a two-dimensional distribution of the obtained strength of the pen signal.

The principles of deriving the position of the electromagnetic induction pen 2 have been described above by illustrating three kinds of principles. The position detecting device 3 according to the present embodiment is configured to derive the position of the electromagnetic induction pen 2 by using the principle illustrated in FIG. 4 among these principles. Next, a layered structure of the structural body 33 according to the present embodiment will be described.

Figure 5:
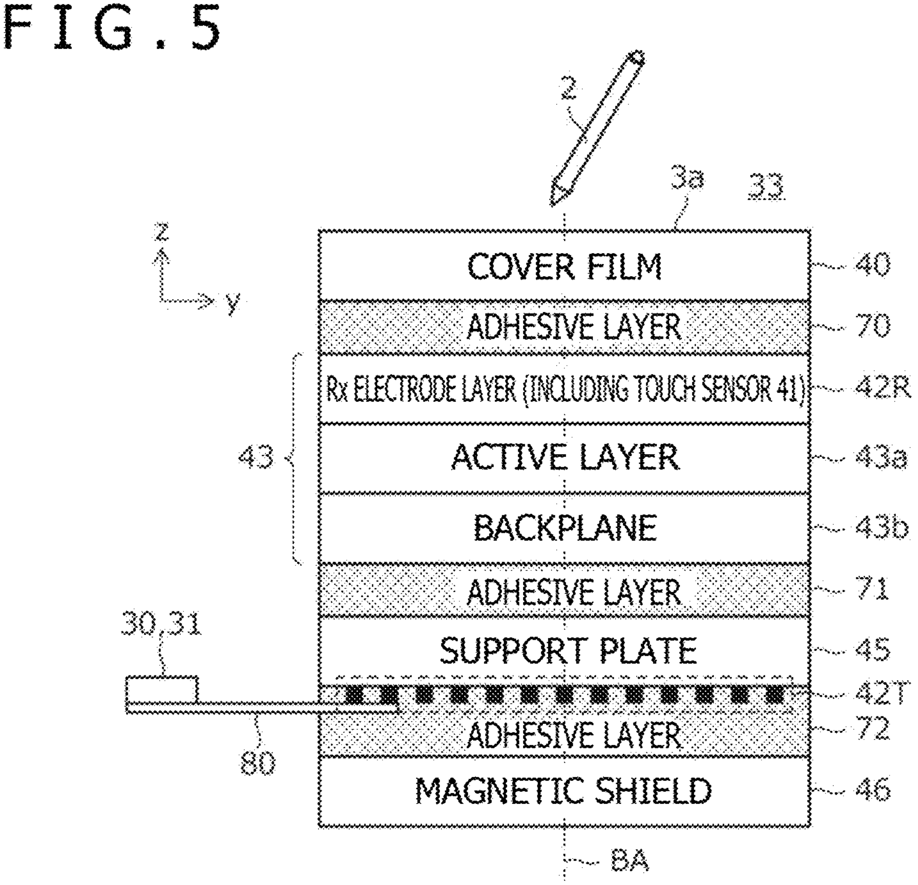
FIG. 5 is a diagram illustrating a layered structure of a structural body illustrated in FIG. 1.

FIG. 5 is a diagram illustrating a layered structure of the structural body 33. As illustrated in the figure, the structural body 33 includes, in order from the panel surface 3*a* side, a cover film 40, an Rx electrode layer 42R, a display image generating layer 43*a*, a backplane 43*b*, a support plate 45, a Tx electrode layer 42T, an adhesive layer 72, and a magnetic shield 46. The display 43 is constituted by the touch sensor 41, the Rx electrode layer 42R, the display image generating layer 43*a*, and the backplane 43*b* among the above. The cover film 40 and the Rx electrode layer 42R are bonded to each other by an adhesive layer 70. The backplane 43*b* and the support plate 45 are bonded to each other by an adhesive layer 71. The support plate 45 and the Tx electrode layer 42T formed on a surface thereof are bonded to the magnetic shield 46 by the adhesive layer 72.

The Rx electrode layer 42R is a layer in which the Rx coils of the EMR sensor 42 are arranged. In the present embodiment, the Rx electrode layer 42R includes also the touch sensor 41. Details of the Rx electrode layer 42R will be described later in detail with reference to FIG. 8.

The Tx electrode layer 42T is a layer in which the Tx coils of the EMR sensor 42 are arranged. The Tx coils of the EMR sensor 42 are formed by printing a conductive material such as copper or silver on the lower surface of the support plate 45. Further details of the Tx electrode layer 42T will be described later in detail with reference to FIG. 6 and FIG. 7.

The display image generating layer 43*a* is a layer that has a role of generating a display image according to control of a driving circuit within the backplane 43*b*. In a case where the display 43 is a liquid crystal display, the display image generating layer 43*a* includes a liquid crystal configured to be able to control a polarization direction in each pixel. In addition, in a case where the display 43 is an organic EL display, the display image generating layer 43*a* includes an organic material configured to be able to control blinking in each pixel. The backplane 43*b* includes the driving circuit that drives the liquid crystal or the organic material within the display image generating layer 43*a* according to a video signal supplied from the host processor 32.

The support plate 45 is a plate-shaped member provided to protect the display 43 from an impact. A "plate PT" described in FIG. 7 of U.S. Patent Application Publication No. 2023-0071229 and a "supporter SP" described in FIG. 7 of U.S. Patent Application Publication No. 2021-0208709 are an example of such a support plate. The support plate 45 is formed by a rigid substrate having low conductivity and having rigidity (for example, a glass epoxy substrate such as Flame Retardant Type 4 (FR 4)). The support plate 45 is formed by a material having low conductivity to avoid an effect on the electromagnetic induction used by the EMR sensor 42. In addition, the support plate 45 is provided with a configuration for realizing folding while maintaining durability. This configuration may be, for example, a groove such as "grooves H" described in U.S. Patent Application Publication No. 2023-0071229 or may be a plurality of holes arranged along the folding axis BA. The support plate 45 is thereby configured to be foldable at the folding axis BA illustrated in the figure.

Figure 6:
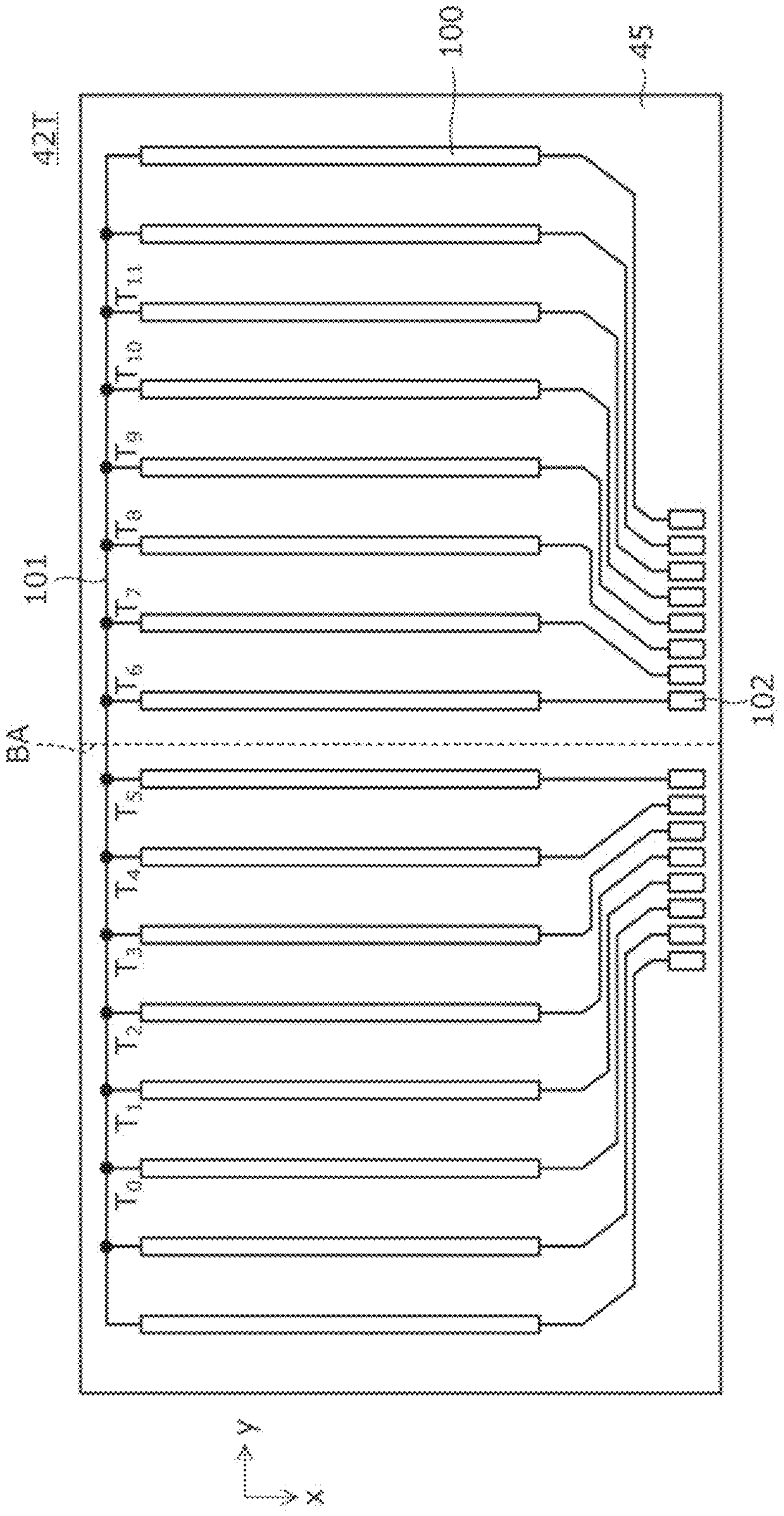
FIG. 6 is a diagram illustrating a planar configuration of a Tx electrode layer illustrated in FIG. 5.

FIG. 6 is a diagram illustrating a planar configuration of the Tx electrode layer 42T. As illustrated in the figure, the Tx electrode layer 42T has a configuration in which a coil of a configuration formed by connecting first ends of a plurality of tooth portions 100 each extending in the x-direction to a base portion 101 extending in the y-direction (which coil will hereinafter be referred to as a "comb-shaped coil") is formed in one layer on the lower surface of the support plate 45. In a case where the Tx coils or the Rx coils of the EMR sensor 42 are provided separately from the Tx electrodes or the Rx electrodes constituting the touch sensor 41, the Tx coils or the Rx coils are preferably formed as a comb-shaped coil as in the Tx electrode layer 42T in FIG. 6. The tooth portions 100 are arranged side by side at equal intervals in the y-direction. Second ends of the respective tooth portions 100 are provided with a pad 102 connected by compression bonding to a connector terminal provided to a surface of a flexible printed board 80 illustrated in FIG. 5. The pads 102 are arranged side by side along one side extending in the y-direction of the support plate 45. It is to be noted that, while FIG. 6 illustrates an example in which the number of tooth portions 100 is 16, this is illustrative, and the number of tooth portions 100 is not limited to 16.

As illustrated in FIG. 6, an arrangement of the parts constituting the Tx electrode layer 42T is determined such that a configuration disposed so as to straddle the folding axis BA is only the base portion 101. It is thereby possible to minimize a possibility of the occurrence of a break in the Tx electrode layer 42T when the structural body 33 is folded along the folding axis BA.

References "$T_0$" to "$T_{11}$" illustrated in FIG. 6 denote the individual Tx coils formed by the comb-shaped coil within the Tx electrode layer 42T. That is, the comb-shaped coil within the Tx electrode layer 42T is configured to be able to implement 12 Tx coils $T_0$ to $T_{11}$. In the following, this will be described in detail with reference to FIG. 7.

Figure 7:
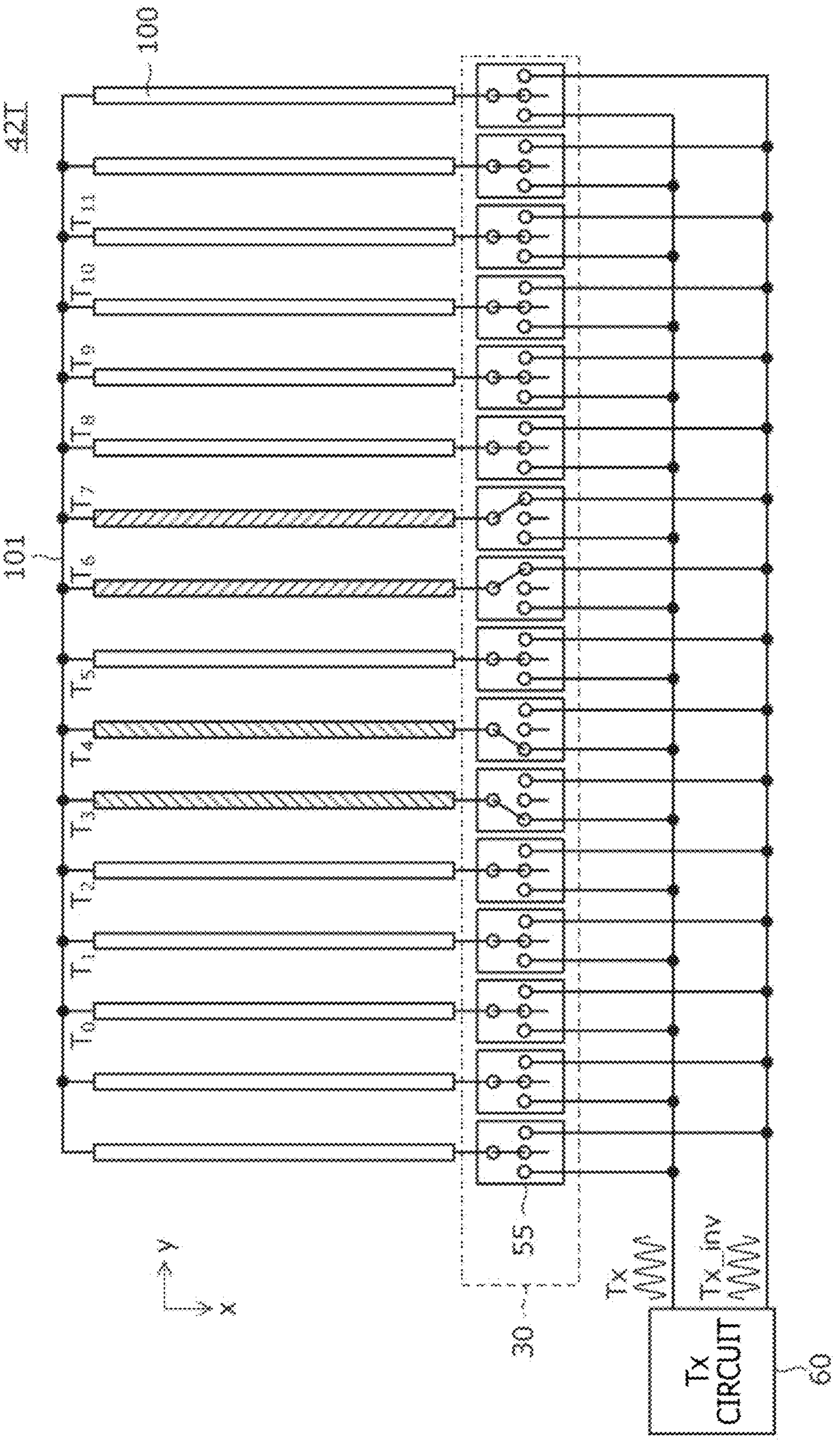
FIG. 7 is a diagram illustrating an electric configuration of the Tx electrode layer illustrated in FIG. 5.

FIG. 7 is a diagram illustrating an electric configuration of the Tx electrode layer 42T. The switch circuit 30 according to the present embodiment includes a switch 55 for each tooth portion 100. Each switch 55 is a single-pole triple-throw switch. A common terminal of the switch 55 is connected to the second end of the corresponding tooth portion 100. In addition, a second selection terminal of each switch 55 is connected to an open end.

The Tx circuit 60 is configured to be able to output an alternating current Tx and an alternating current Tx_inv that is generated by inverting the phase of the alternating current Tx. First selection terminals of the switches 55 are connected in common to an output terminal of the alternating current Tx of the Tx circuit 60. Third selection terminals of the switches 55 are connected in common to an output terminal of the alternating current Tx_inv of the Tx circuit 60.

In a case of sending out an alternating magnetic field from the Tx electrode layer 42T, the sensor controller 31 first selects one tooth portion 100, switches two switches 55 corresponding to two tooth portions 100 adjacent on one side of the one tooth portion 100 to the first selection terminal side, and switches two switches 55 corresponding to two tooth portions 100 adjacent on another side of the one tooth portion 100 to the third selection terminal side. The sensor controller 31 sets the other switches 55 in a state in which the second selection terminals are selected. FIG. 7 illustrates a state in which the sensor controller 31 has selected a tooth portion 100 located at a position denoted as "$T_5$" in the figure.

After performing the switching of each switch 55 as described above, the sensor controller 31 starts to output the alternating currents Tx and Tx_inv from the Tx circuit 60. Then, the alternating current Tx flows through the two tooth portions 100 adjacent on the one side of the selected tooth portion 100 (respective tooth portions 100 located at positions denoted as "$T_3$" and "$T_4$" in the example of FIG. 7), and the alternating current Tx_inv flows through the two tooth portions 100 adjacent on the other side of the selected tooth portion 100 (respective tooth portions 100 located at positions denoted as "$T_6$" and "$T_7$" in the example of FIG. 7). Thus, a virtual loop coil around the tooth portion 100 selected by the sensor controller 31 is formed, and an alternating magnetic field is sent out from this virtual loop coil. The Tx coils within the Tx electrode layer 42T are formed by thus formed virtual loop coils.

Figure 8:
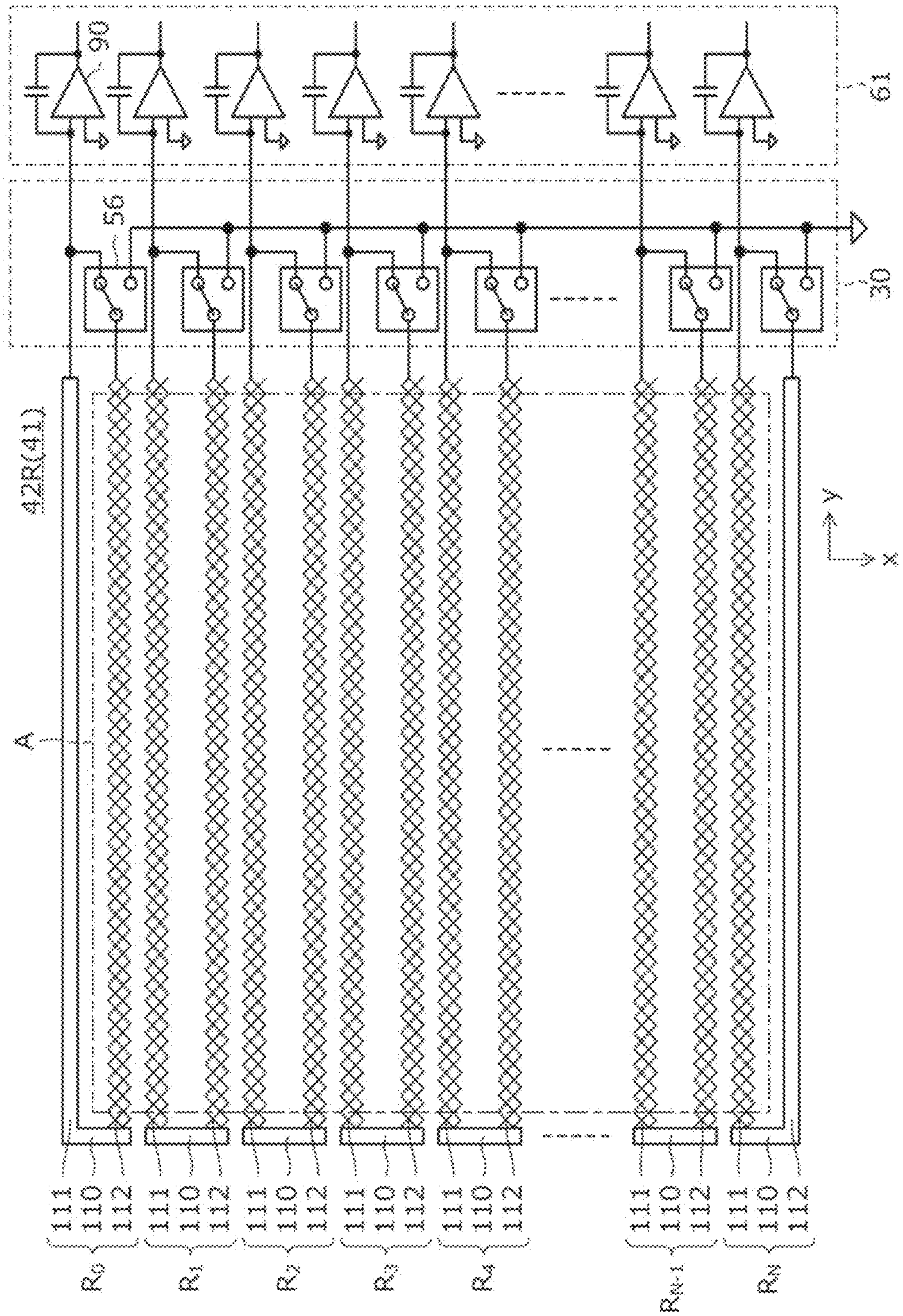
FIG. 8 is a diagram illustrating a planar configuration and an electric configuration of an Rx electrode layer illustrated in FIG. 5.

FIG. 8 is a diagram illustrating a planar configuration and an electric configuration of the Rx electrode layer 42R. Here, the Rx electrode layer 42R has a two-layer structure, and includes another layer separately from the layer illustrated in FIG. 8. The Tx electrodes (not illustrated) of the touch sensor 41 are formed in this another layer. In the following, the description will be continued with attention directed to the layer illustrated in FIG. 8.

As illustrated in FIG. 8, the Rx electrode layer 42R has a configuration in which N+1 coil-shaped electrodes $R_0$ to $R_N$ respectively constituting the Rx coils of the EMR sensor 42 and the Rx electrodes of the touch sensor 41 are juxtaposed to each other in the x-direction. In the following description, when the coil-shaped electrodes $R_0$ to $R_N$ do not particularly need to be distinguished from each other, the coil-shaped electrodes $R_0$ to $R_N$ may be referred to collectively as "coil-shaped electrodes R." The coil-shaped electrodes R are arranged side by side in the x-direction so as not to overlap each other.

Each coil-shaped electrode R is formed by a U-shaped (Π-shaped) conductor having a configuration formed by connecting respective first ends of two conductors 111 and 112 extended in parallel with each other along the y-direction to each other by a connecting wire 110 extending in the x-direction. Of these, the connecting wire 110 is extended outside the active area A, and is formed by an opaque plate-shaped conductor. In a case where the Tx electrodes or the Rx electrodes constituting the touch sensor 41 are used also as the Tx coils or the Rx coils of the EMR sensor 42, U-shaped (Π-shaped) conductors such as the coil-shaped electrodes R in FIG. 8 are suitably used. This is because when the coil-shaped electrodes R are formed by the comb-shaped coil described above, the whole of the comb-shaped coil constitutes one large conductor and thus has too high a wiring capacitance, and it therefore becomes difficult to make the comb-shaped coil function as the Tx electrodes or the Rx electrodes of the touch sensor 41, whereas when the coil-shaped electrodes R are formed by U-shaped (Π-shaped) conductors, the coil-shaped electrodes R are in a state of being electrically separated from each other, and therefore, such a problem does not occur. In addition, when the coil-shaped electrodes R are formed in a U-shape (Π-shape), the coil-shaped electrodes R can be formed so as not to overlap each other, as illustrated in FIG. 8. This also makes it possible to form the Rx electrode layer 42R and the Rx electrodes of the touch sensor 41 in one layer.

A conductor extended so as to be stretched within the active area A among the conductors 111 and 112 of each coil-shaped electrode R is formed by a mesh electrode (parts represented by intersecting thin lines in FIG. 8) having a repetition of a predetermined local pattern. On the other hand, a conductor extended only outside the active area A among the conductors 111 and 112 of each coil-shaped electrode R is formed by an opaque plate-shaped conductor similar to the connecting wire 110. In the example of FIG. 8, both of the conductors 111 and 112 of the coil-shaped electrodes $R_1$ to $R_{N-1}$ other than the coil-shaped electrode $R_0$ and the coil-shaped electrode $R_N$ located at both ends among the N coil-shaped electrodes $R_0$ to $R_N$ are extended so as to be stretched within the active area A, and are formed by a mesh electrode. The conductor 112 of the coil-shaped electrode $R_0$ (conductor on a side close to the coil-shaped electrode $R_1$) and the conductor 111 of the coil-shaped electrode $R_N$ (conductor on a side close to the coil-shaped electrode $R_{N-1}$) are also similarly extended so as to be stretched within the active area A, and are formed by a mesh electrode. On the other hand, the conductor 111 of the coil-shaped electrode $R_0$ and the conductor 112 of the coil-shaped electrode $R_N$ are extended only outside the active area A, and are formed by an opaque metallic conductor.

A conductor extended so as to be stretched within the active area A among the conductors 111 and 112 of each coil-shaped electrode R is formed by a mesh electrode in order to minimize an effect on the visibility of the image displayed by the display 43. In order to reduce variations in the visibility within the active area A, a dummy mesh electrode may be formed in a region between the conductors 111 and 112. A transparent electrode of indium tin oxide (ITO) or the like may be used in place of the mesh electrode.

The switch circuit 30 according to the present embodiment includes a switch 56 for each coil-shaped electrode R. Each switch 56 is formed by a single-pole double-throw switch having a selection terminal connected to first end of the corresponding coil-shaped electrode R, a grounded selection terminal, and a common terminal connected to second end of the corresponding coil-shaped electrode R. In addition, the Rx circuit 61 includes an inverting amplifier circuit 90 for each coil-shaped electrode R. First end of each coil-shaped electrode R is connected also to an input terminal of the corresponding inverting amplifier circuit 90 as well as the selection terminal of the corresponding switch 56.

In a case of using each coil-shaped electrode R as an Rx coil of the EMR sensor, the sensor controller 31 switches each switch 56 to the grounded selection terminal side. Thus, the connection state of each coil-shaped electrode R becomes the same state as the connection state of each loop coil LCx illustrated in FIG. 4. The sensor controller 31 can therefore derive the position of the electromagnetic induction pen 2 within the panel surface 3_a_ by performing the same processing as the processing described with reference to FIG. 4.

In a case of using each coil-shaped electrode R as an Rx electrode of the touch sensor 41, on the other hand, the sensor controller 31 switches each switch 56 to the selection terminal side connected to the first end of the corresponding coil-shaped electrode R. Thus, each coil-shaped electrode R functions as one linear electrode, and the linear electrode is connected to the respective inverting amplifier circuit 90. The sensor controller 31 can therefore derive the position of the finger within the panel surface 3_a_ by performing the same processing as the processing described with reference to FIG. 1.

As described above, according to the position detection system 1 in accordance with the present embodiment, the Rx electrode layer 42R is disposed on an opposite side from the side provided with the Tx electrode layer 42T with the display image generating layer at a center. Thus, a state can be obtained in which after incorporating one (Rx electrode layer 42R in the present embodiment) into the display 43 together with the touch sensor 41 (hence, after setting the one in a state enabling precise position determination with respect to the folding axis BA), it suffices to make a contrivance so as to enable only the other (Tx electrode layer 42T in the present embodiment) to be folded. This contrivance in the present embodiment is one such that the Tx electrode layer 42T is formed in one layer and further the configuration disposed so as to straddle the folding axis BA is only one wire (specifically the base portion 101). In a case where the configuration disposed so as to straddle the folding axis BA is to this degree, the Tx electrode layer 42T can be made to support folding even when it is difficult to precisely determine the position of each wire within the Tx electrode layer 42T with respect to the folding axis BA. Hence, the position detection system 1 according to the present embodiment can be said to be able to provide a position detecting device that includes a foldable display and supports position detection of an electromagnetic induction pen by the EMR system.

Incidentally, while a description has been made of an example in which the Tx electrode layer 42T is constituted by a comb-shaped coil in the present embodiment, the Rx electrode layer 42R can also be constituted by a similar comb-shaped coil. In addition, the Tx electrode layer 42T can also be constituted by a plurality of coil-shaped electrodes arranged so as not to overlap each other. In this case, when the position of each coil-shaped electrode can be determined such that the folding axis BA is included in a region without wiring between coil-shaped electrodes, it suffices to do so, or when it is difficult to make such a position determination because the region without wiring between the coil-shaped electrodes is narrow, it suffices to determine the position of each coil-shaped electrode such that a wire corresponding to a connecting wire 110 illustrated in FIG. 8 is disposed so as to straddle the folding axis BA.

Figure 9:
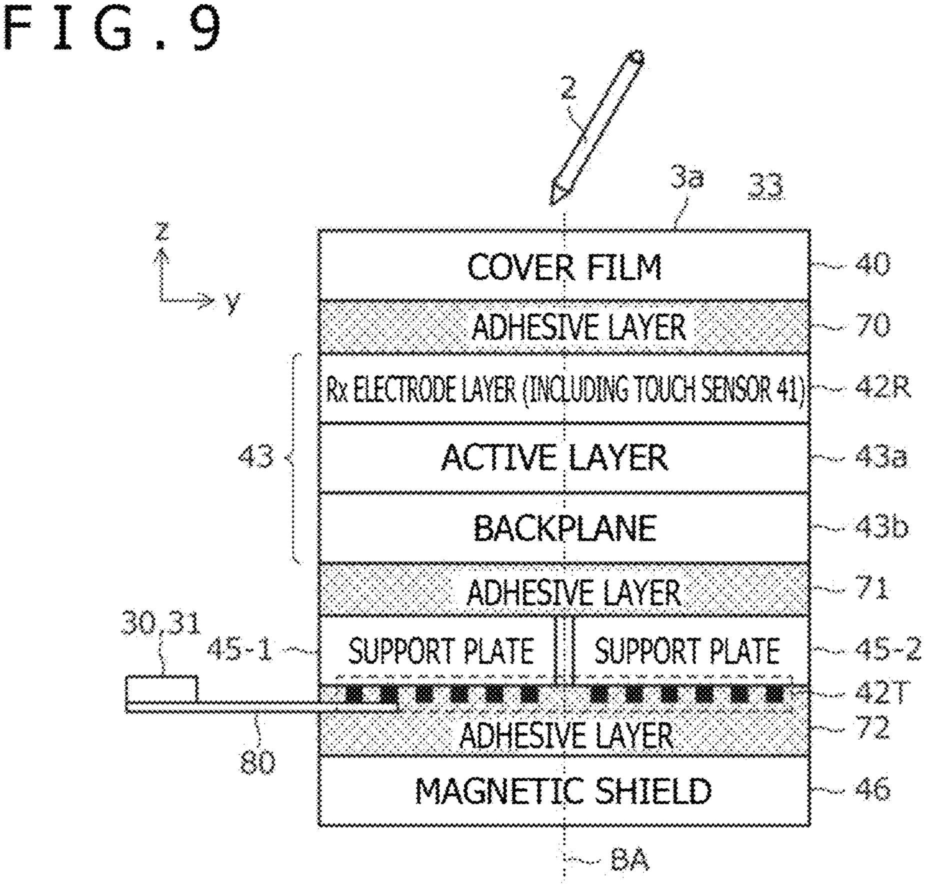
FIG. 9 is a diagram illustrating a layered structure of the structural body included in a position detecting device according to a first modification of the first embodiment of the present disclosure.

FIG. 9 is a diagram illustrating a layered structure of the structural body 33 included in a position detecting device 3 according to a first modification of the present embodiment. The position detecting device 3 according to the present modification is different from the position detecting device 3 according to the present embodiment in that the support plate 45 is divided into two support plates 45-1 and 45-2 with the folding axis BA as a boundary.

Figure 10:
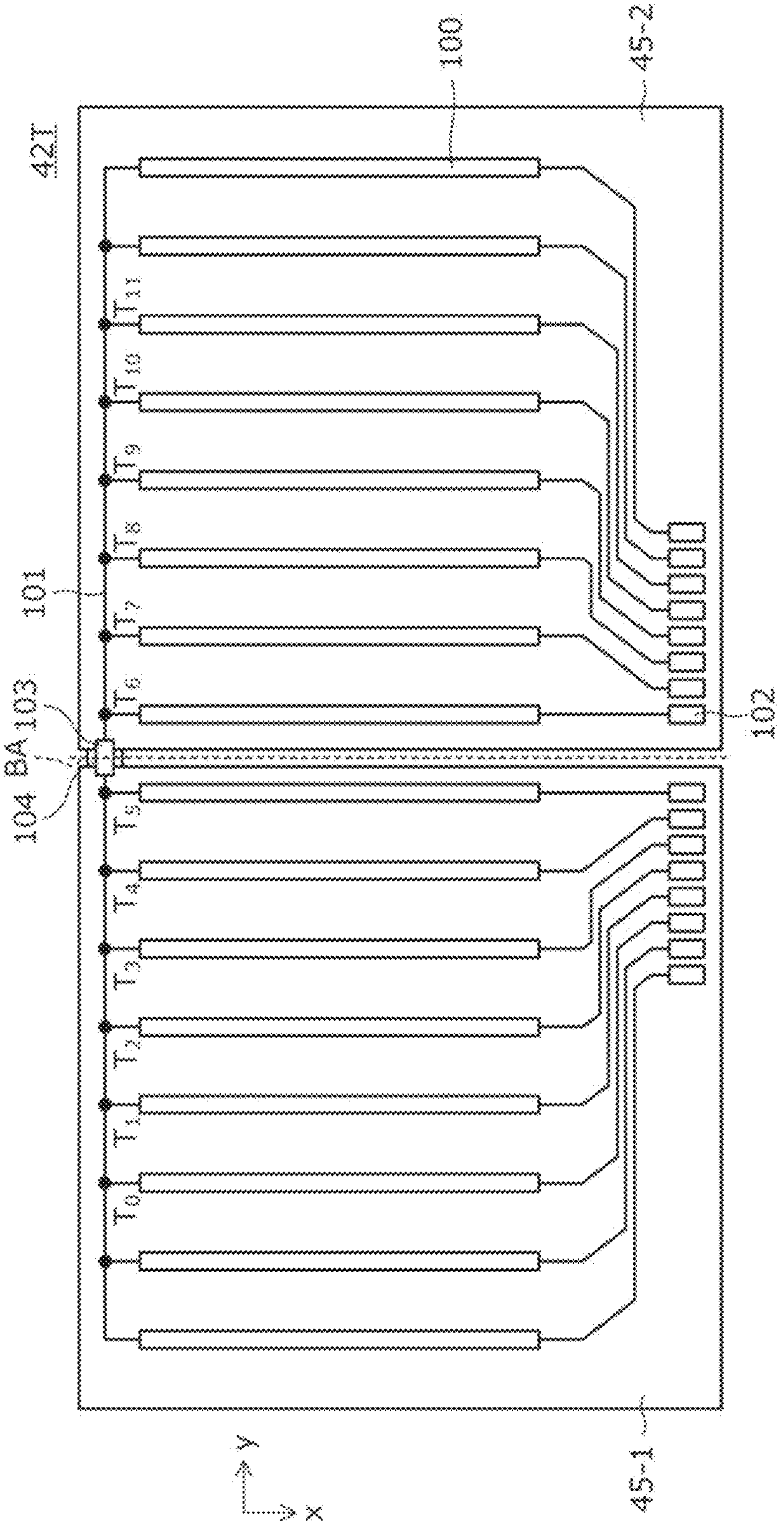
FIG. 10 is a diagram illustrating a planar configuration of the Tx electrode layer illustrated in FIG. 9.

FIG. 10 is a diagram illustrating a planar configuration of the Tx electrode layer 42T according to the present modification. As is also illustrated in the figure, the Tx electrode layer 42T needs to be disposed so as to straddle the respective surfaces of the support plates 45-1 and 45-2 divided in two in the present modification. Thus, a folding portion 104 formed by a member or a structure having flexibility is provided between the support plates 45-1 and 45-2, and a connecting conductor 103 extended so as to straddle the folding axis BA is formed on the surface of the folding portion 104. The connecting conductor 103 electrically connects parts of the base portion 101 provided to the support plates 45-1 and 45-2, respectively. The connecting conductor 103 is preferably formed by a material or a structure such as is less likely to cause a break in response to a bending operation than the base portion 101 and the tooth portions 100. By adopting the configuration as described above, the present modification can also provide a position detecting device that includes a foldable display and supports position detection of an electromagnetic induction pen by the EMR system.

Figure 11:
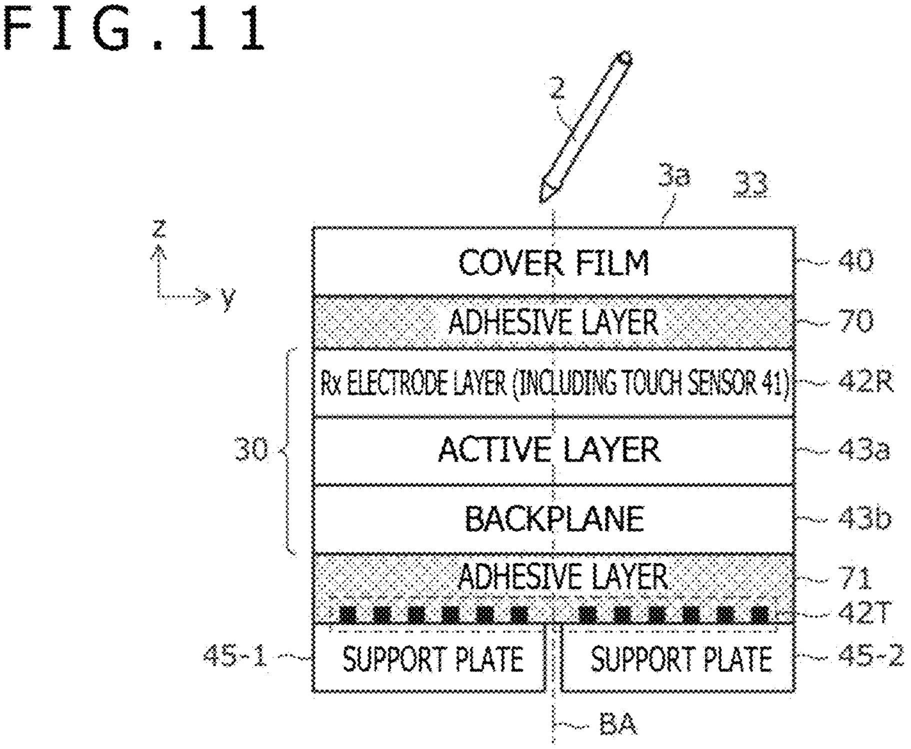
FIG. 11 is a diagram illustrating a layered structure of the structural body included in a position detecting device according to a second modification of the first embodiment of the present disclosure.

FIG. 11 is a diagram illustrating a layered structure of the structural body 33 included in a position detecting device 3 according to a second modification of the present embodiment. The position detecting device 3 according to the present modification is different from the position detecting device 3 according to the first modification in that the position detecting device 3 according to the present modification does not have the adhesive layer 72 nor the magnetic shield 46 and in that the Tx electrode layer 42T is disposed on the upper surfaces of the support plates 45-1 and 45-2. In a case where none of the adhesive layer 72 and the magnetic shield 46 is provided as described above, the Tx electrode layer 42T is preferably disposed on the upper surfaces of the support plates 45-1 and 45-2 rather than the lower surfaces thereof.

Figure 12:
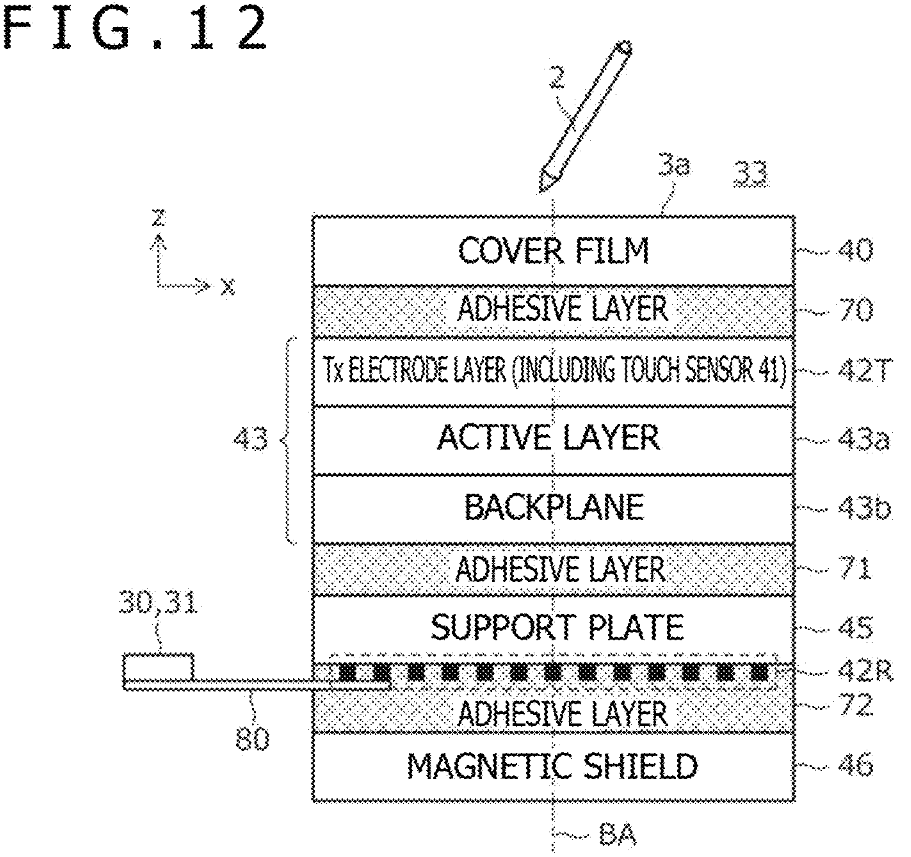
FIG. 12 is a diagram illustrating a layered structure of the structural body included in a position detecting device according to a third modification of the first embodiment of the present disclosure.

FIG. 12 is a diagram illustrating a layered structure of the structural body 33 included in a position detecting device 3 according to a third modification of the present embodiment. The position detecting device 3 according to the present modification is different from the position detecting device 3 according to the present embodiment in that the positions of the Tx electrode layer 42T and the Rx electrode layer 42R are interchanged. In the present modification, the touch sensor 41 is included in the Tx electrode layer 42T. Thus, the Tx electrode layer 42T may be provided within the display 43, and the Rx electrode layer 42R may be provided on a surface of the support plate 45.

Figure 13:
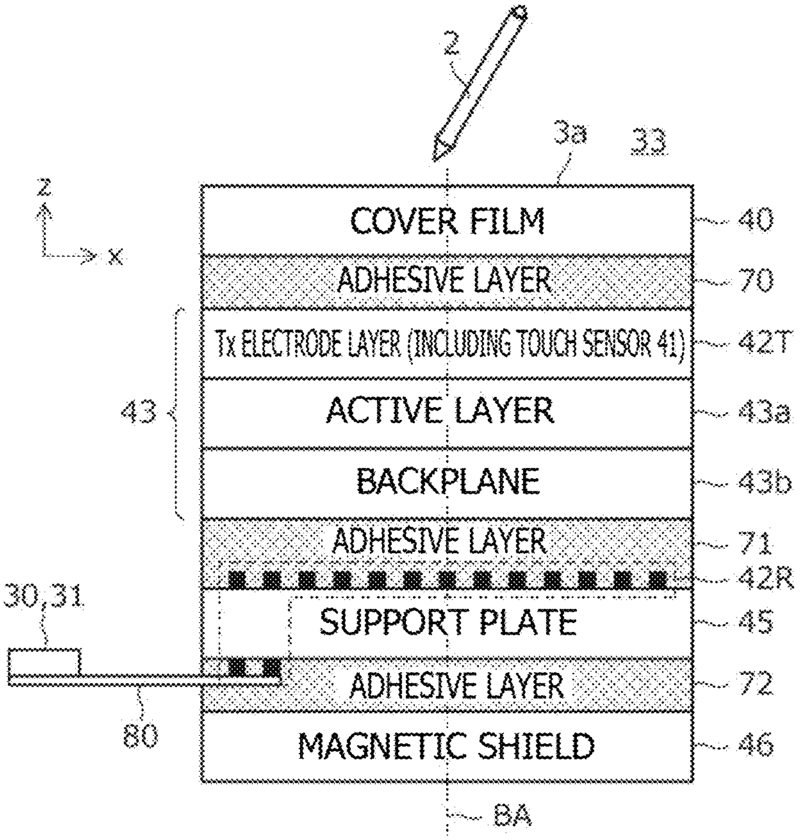
FIG. 13 is a diagram illustrating a layered structure of the structural body included in a position detecting device according to a fourth modification of the first embodiment of the present disclosure.

FIG. 13 is a diagram illustrating a layered structure of the structural body 33 included in a position detecting device 3 according to a fourth modification of the present embodiment. The position detecting device 3 according to the present modification is different from the position detecting device 3 according to the third modification in that the Rx electrode layer 42R is formed on the upper surface of the support plate 45. However, as with the Rx electrode layer 42R according to the third modification, the Rx electrode layer 42R according to the present modification is compression-bonded, at the lower surface of the support plate 45, to connector terminals provided to the surface of the flexible printed board 80. In order to realize this, the structural body 33 according to the present modification has a plurality of pads for the compression bonding at the lower surface of the support plate 45, and the Rx coils constituting the Rx electrode layer 42R are respectively connected to the plurality of pads by via conductors not illustrated. Thus, the Rx electrode layer 42R may be connected to the flexible printed board 80 at the surface on an opposite side from a surface of the support plate 45 on which surface the Rx electrode layer 42R itself is formed.

Figure 14:
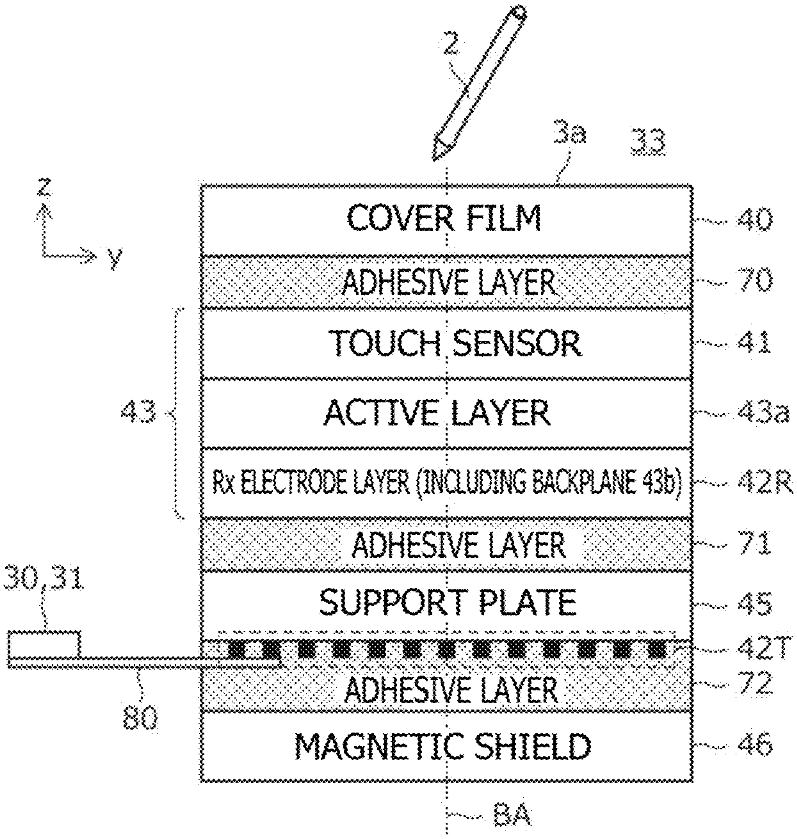
FIG. 14 is a diagram illustrating a layered structure of the structural body included in a position detecting device according to a fifth modification of the first embodiment of the present disclosure.

FIG. 14 is a diagram illustrating a layered structure of the structural body 33 included in a position detecting device 3 according to a fifth modification of the present embodiment. The position detecting device 3 according to the present modification is different from the position detecting device 3 according to the present embodiment in that the Rx electrode layer 42R is provided in the same layer as the backplane 43*b* rather than the touch sensor 41. Thus, the Rx electrode layer 42R may be provided in the same layer as the backplane 43*b*. Each Rx coil in this case is extended so as to avoid elements and wiring for driving pixels, the elements and the wiring being essentially arranged within the backplane 43*b*. Though not illustrated in the figure, as with the Rx electrode layer 42R according to the present modification, the Tx electrode layer 42T according to the third modification illustrated in FIG. 12, for example, may also be provided in the same layer as the backplane 43*b*.

A description will next be made of a position detection system 1 according to a second embodiment of the present disclosure. The position detection system 1 according to the present embodiment is different from the position detection system 1 according to the first embodiment in that the Rx electrode layer 42R is disposed on the lower surface of the support plate 45 and in that the Tx electrode layer 42T is disposed on the upper surface of the support plate 45. The position detection system 1 according to the present embodiment is otherwise similar to the position detection system 1 according to the first embodiment. Thus, in the following, the description will be continued with attention directed to differences from the position detection system 1 according to the first embodiment.

Figure 15:
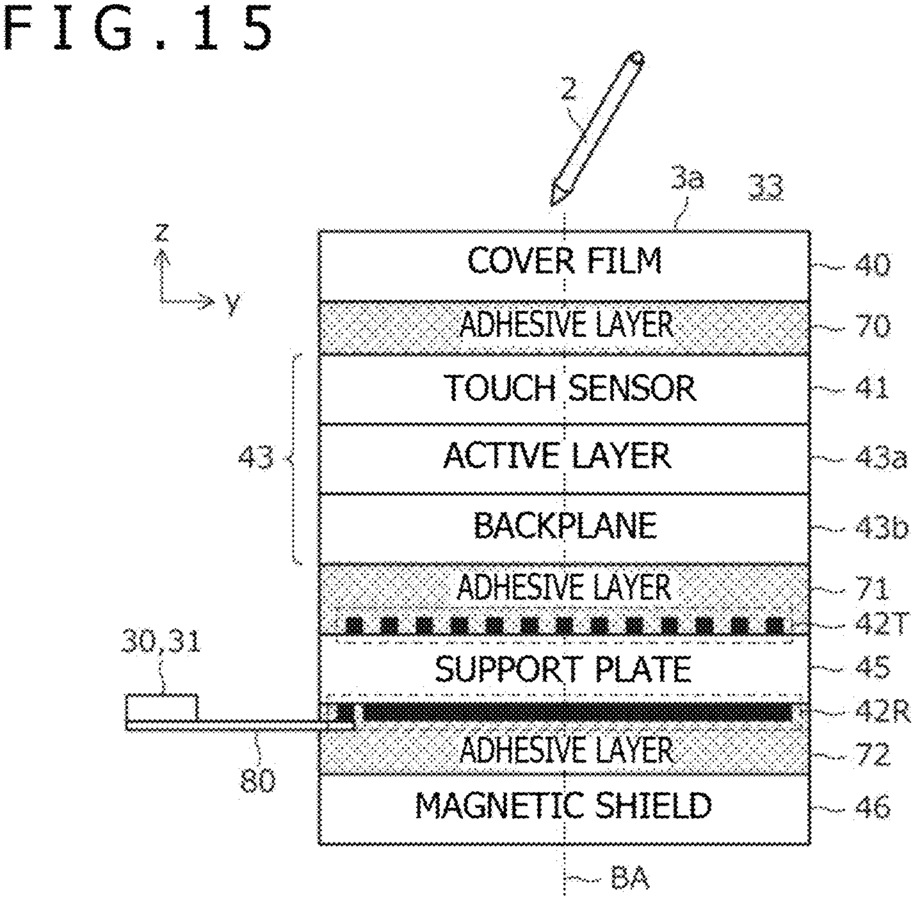
FIG. 15 is a diagram illustrating a layered structure of the structural body included in a position detecting device according to a second embodiment of the present disclosure.

FIG. 15 is a diagram illustrating a layered structure of the structural body 33 included in the position detecting device 3 according to the present embodiment. As illustrated in the figure, in the position detecting device 3 according to the present embodiment, the Rx electrode layer 42R is disposed on the lower surface of the support plate 45, and the Tx electrode layer 42T is disposed on the upper surface of the support plate 45. A group of the Rx coils within the Rx electrode layer 42R and a group of the Tx coils within the Tx electrode layer 42T are each formed in one layer. Specifically, it suffices for each of the Rx coil group and the Tx coil group to be formed by a comb-shaped coil similar to that described with reference to FIG. 6 and FIG. 7 or a plurality of coils arranged so as not to overlap each other.

A plurality of pads compression-bonded to connector terminals of the flexible printed board 80 for both the Rx coil group and the Tx coil group are provided to the lower surface of the support plate 45. The Rx coils within the Rx electrode layer 42R are connected to the corresponding pads by wiring not illustrated within the same plane. The Tx coils within the Tx electrode layer 42T are connected to the corresponding pads by via conductors not illustrated.

As described above, according to the position detection system 1 in accordance with the present embodiment, the Rx coil group within the Rx electrode layer 42R and the Tx coil group within the Tx electrode layer 42T are each formed in one layer on the respective surfaces of the support plate 45. Thus, as compared with a case where the Rx coil group within the Rx electrode layer 42R and the Tx coil group within the Tx electrode layer 42T are each formed in multiple layers, the occurrence of a break due to folding can be suppressed even when it is difficult to precisely determine the position of wiring within each layer with respect to the folding axis BA. Hence, the position detection system 1 according to the present embodiment can also be said to be able to provide a position detecting device that includes a foldable display and supports position detection of an electromagnetic induction pen by the EMR system.

In addition, the position detection system 1 according to the present embodiment can achieve a reduction in thickness of the structural body 33 including the EMR sensor 42 as compared with a case where one of or both the Rx coil group within the Rx electrode layer 42R and the Tx coil group within the Tx electrode layer 42T are formed in multiple layers.

Figure 16:
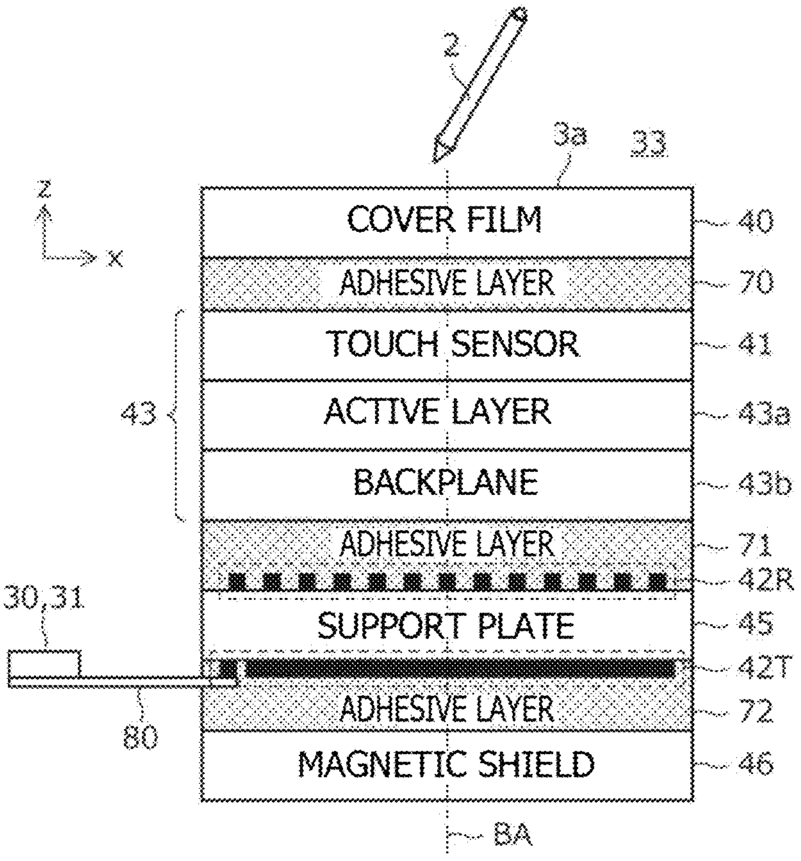
FIG. 16 is a diagram illustrating a layered structure of the structural body included in a position detecting device according to a first modification of the second embodiment of the present disclosure.

FIG. 16 is a diagram illustrating a layered structure of the structural body 33 included in a position detecting device 3 according to a first modification of the present embodiment. The position detecting device 3 according to the present modification is different from the position detecting device 3 according to the present embodiment in that the Rx electrode layer 42R is formed on the upper surface of the support plate 45 and in that the Tx electrode layer 42T is formed on the lower surface of the support plate 45. In the present modification, the Tx coils within the Tx electrode layer 42T are connected to corresponding pads by wiring not illustrated within the same plane, and the Rx coils within the Rx electrode layer 42R are connected to corresponding pads by via conductors not illustrated. The configuration of the present modification can also be said to be able to provide a position detecting device that includes a foldable display and supports position detection of an electromagnetic induction pen by the EMR system and to be able to achieve a reduction in thickness of the structural body 33 including the EMR sensor 42 because of reasons similar to those of the present embodiment.

Figure 17A:
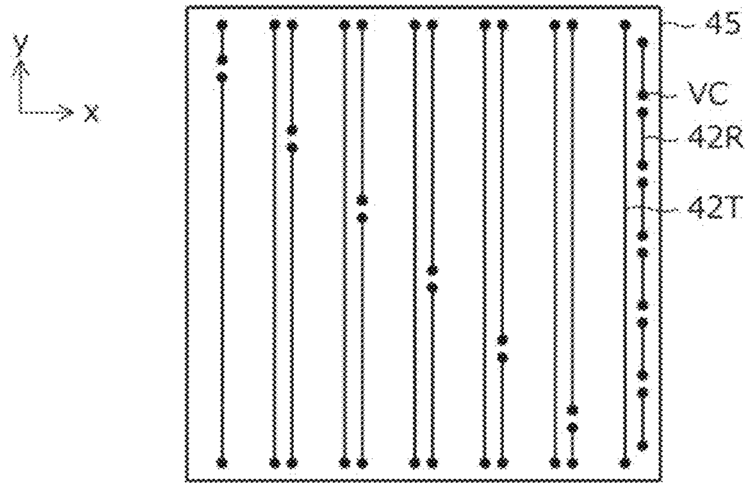
FIG. 17A is a diagram illustrating the upper surface of a support plate included in a position detecting device according to a second modification of the second embodiment of the present disclosure.
Figure 17B:
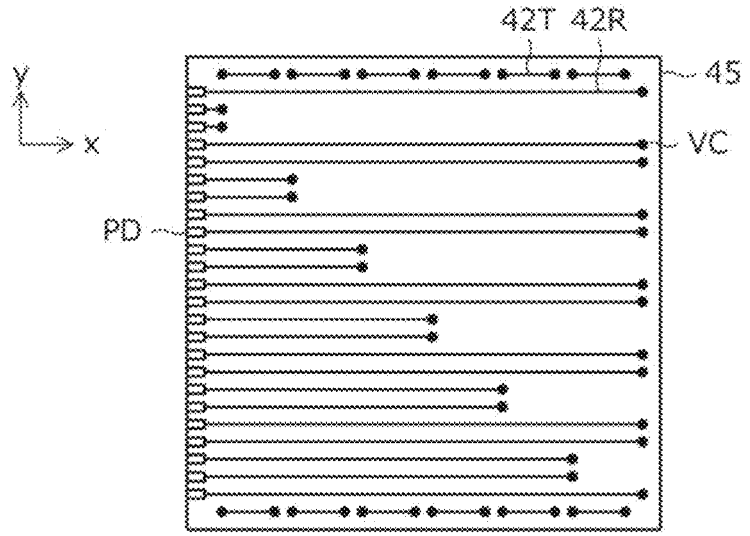
FIG. 17B is a diagram illustrating the lower surface of the support plate included in the position detecting device according to the second modification of the second embodiment of the present disclosure.

FIG. 17A is a diagram illustrating the upper surface of the support plate 45 included in a position detecting device 3 according to a second modification of the present embodiment. FIG. 17B is a diagram illustrating the lower surface of the support plate 45 included in the position detecting device 3 according to the second modification of the present embodiment. The position detecting device 3 according to the present modification is different from the position detecting device 3 according to the present embodiment in that each of the Rx electrode layer 42R and the Tx electrode layer 42T is formed on both the upper surface and the lower surface of the support plate 45. In the present modification, of wires formed in the Rx electrode layer 42R and the Tx electrode layer 42T, parts extending in the y-direction are formed on the upper surface of the support plate 45, and parts extending in the x-direction are formed on the lower surface of the support plate 45. Respective parts of each Tx coil and each Rx coil are interconnected by via conductors VC, and thereby constitute one coil as viewed in plan. Both ends of each Tx coil and each Rx coil are each connected to a pad PD. The configuration of the present modification can also be said to be able to provide a position detecting device that includes a foldable display and supports position detection of an electromagnetic induction pen by the EMR system and to be able to achieve a reduction in thickness of the structural body 33 including the EMR sensor 42 because of reasons similar to those of the present embodiment. Incidentally, in FIGS. 17A and 17B, it is needless to say that the Rx electrode layer 42R and the Tx electrode layer 42T may be interchanged.

A position detection system 1 according to a third embodiment of the present disclosure will next be described. The position detection system 1 according to the present embodiment is different from the position detection system 1 according to the first embodiment in that the display 43 is not foldable and in that the Tx electrode layer 42T is provided in the same layer as the backplane 43*b* rather than on a surface of the support plate 45. The position detection system 1 according to the present embodiment is otherwise similar to the position detection system 1 according to the first embodiment. Thus, in the following, the description will be continued with attention directed to differences from the position detection system 1 according to the first embodiment.

FIG. 18 is a diagram illustrating a layered structure of the structural body 33 included in the position detecting device 3 according to the present embodiment. As is understood by comparing FIG. 18 with FIG. 5, the structural body 33 according to the present embodiment is different from the structural body 33 according to the first embodiment in that the structural body 33 according to the present embodiment includes a cover glass 44 in place of the cover film 40, in that the structural body 33 according to the present embodiment does not have the support plate 45, the magnetic shield 46, nor the adhesive layers 71 and 72, and in that the Tx electrode layer 42T is provided in the same layer as the backplane 43*b*.

The structural body 33 according to the present embodiment includes the cover glass 44 in place of the cover film 40 because the structural body 33 according to the present embodiment does not need to be folded. The cover glass 44 is not bent. On the other hand, the cover glass 44 is high in strength and durability as compared with the cover film 40. Thus, in a case where the folding is not necessary, the cover glass 44 is preferably used in place of the cover film 40. Because the cover glass 44 of high strength is used, the support plate 45 is not necessary in the structural body 33 according to the present embodiment.

The Rx coils within the Rx electrode layer 42R according to the present embodiment are formed in one layer on one surface (specifically, the upper surface) of the display image generating layer 43*a*. A concrete configuration of the Rx coils may be similar to that described with reference to FIG. 8. That is, it suffices to form the plurality of Rx coils by using the plurality of coil-shaped electrodes R not overlapping each other, form a conductor extended so as to be stretched within the active area A among the conductors 111 and 112 constituting each coil-shaped electrode R by using a mesh electrode, and form a conductor extended only outside the active area A by using an opaque plate-shaped conductor. In addition, it suffices to provide, outside the active area A, the connecting wire 110 as an opaque plate-shaped conductor that connects first ends of the respective conductors 111 and 112 to each other.

In addition, the Tx coils within the Tx electrode layer 42T according to the present embodiment are formed in one layer in the same layer as the backplane 43*b*. Specifically, as with the Rx coils within the Rx electrode layer 42R described with reference to FIG. 14, it suffices to extend the Tx coils so as to avoid elements and wiring for driving pixels, the elements and the wiring being essentially arranged within the backplane 43*b*. In addition, it suffices for the planar shape of the Tx electrode layer 42T to be that of a comb-shaped coil as described with reference to FIG. 6.

As described above, according to the position detection system 1 in accordance with the present embodiment, the Rx coil group within the Rx electrode layer 42R and the Tx coil group within the Tx electrode layer 42T are each formed in one layer. It is therefore possible to achieve a reduction in thickness of the structural body 33 including the EMR sensor 42.

Incidentally, while the folding of the structural body 33 is not a problem in the position detecting device 3 according to the present embodiment, the configuration of the Rx electrode layer 42R and the Tx electrode layer 42T in the present embodiment is applicable also to the structural body 33 described in the first embodiment. Then, in that case, each of the wires within the Rx electrode layer 42R and the wires within the Tx electrode layer 42T can be precisely positioned with respect to the folding axis BA. It is therefore possible to provide a position detecting device that includes a foldable display and supports position detection of an electromagnetic induction pen by the EMR system.

Figure 19:
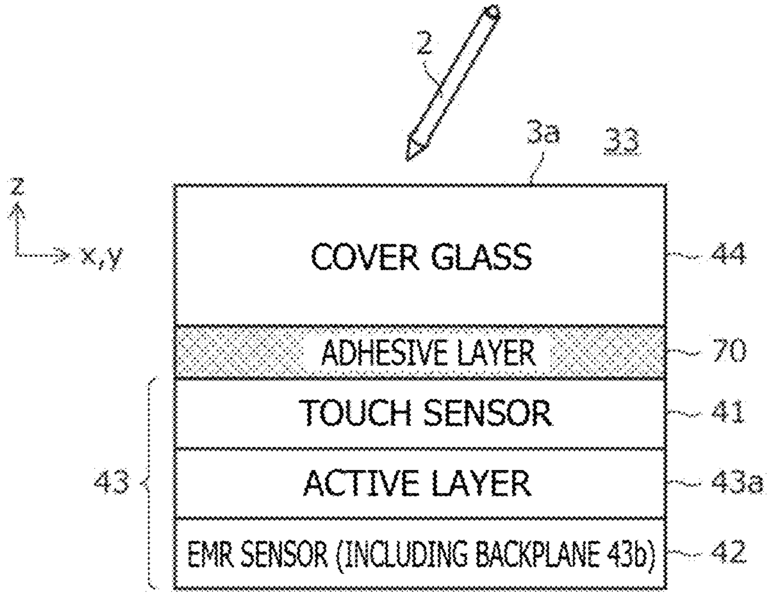
FIG. 19 is a diagram illustrating a layered structure of the structural body included in a position detecting device according to a first modification of the third embodiment of the present disclosure.

FIG. 19 is a diagram illustrating a layered structure of the structural body 33 included in a position detecting device 3 according to a first modification of the present embodiment. The position detecting device 3 according to the present modification is different from the position detecting device 3 according to the present embodiment in that both the Rx coil group and the Tx coil group constituting the EMR sensor 42 are formed in the same layer as the backplane 43*b*. According to the present modification, the Rx coils of the EMR sensor 42 and the Rx electrodes of the touch sensor 41 cannot be formed by the same coil-shaped electrodes. However, by forming each of the Tx coil group and the Rx coil group of the EMR sensor 42 by using a comb-shaped coil similar to that described with reference to FIG. 6 and FIG. 7 or a plurality of coil-shaped electrodes arranged so as not to overlap each other, it is possible to achieve a reduction in thickness of the structural body 33 including the EMR sensor 42 as compared with a case where one of or both the Tx coil group and the Rx coil group of the EMR sensor 42 are formed in a multilayer structure.

Figure 20:
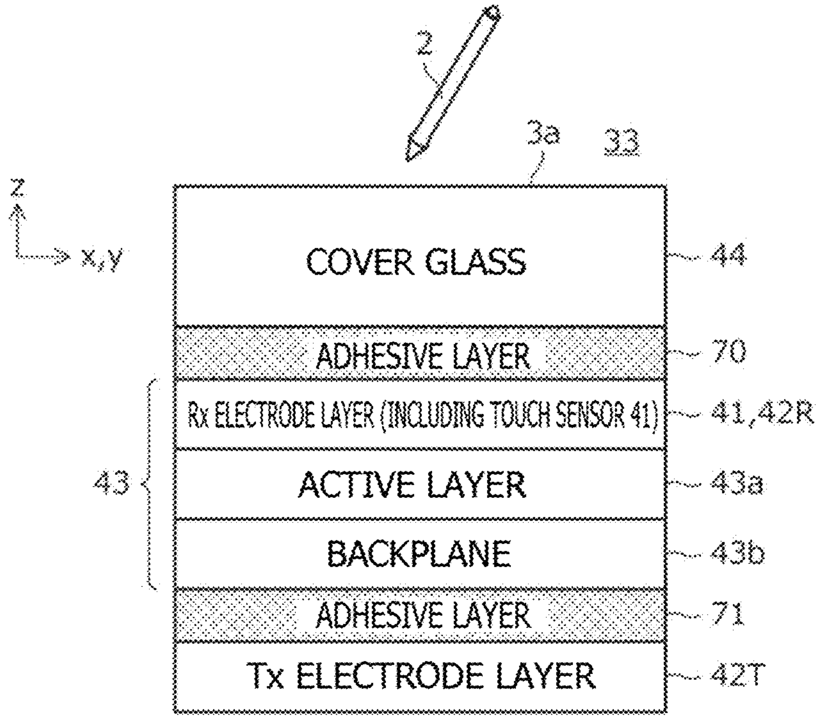
FIG. 20 is a diagram illustrating a layered structure of the structural body included in a position detecting device according to a second modification of the third embodiment of the present disclosure.

FIG. 20 is a diagram illustrating a layered structure of the structural body 33 included in a position detecting device 3 according to a second modification of the present embodiment. The position detecting device 3 according to the present modification is different from the position detecting device 3 according to the present embodiment in that the Tx electrode layer 42T is not provided within the display 43, but is arranged in a layer below the display 43 via an adhesive layer 71. Thus, the Tx electrode layer 42T may be arranged in a layer below the display 43 via the adhesive layer 71. A concrete configuration of the Tx electrode layer 42T in this case may be a comb-shaped coil similar to that described with reference to FIG. 6 and FIG. 7, or may be a plurality of coil-shaped electrodes electrically separated from each other. In the latter case, the plurality of Tx coils may be formed by using a plurality of layers (that is, so as to overlap each other), or the plurality of Tx coils may be formed in one layer (that is, so as not to overlap each other). When the plurality of Tx coils are formed in one layer, it is possible to achieve a corresponding reduction in thickness of the structural body 33 including the EMR sensor 42, and to provide a position detecting device that includes a foldable display and supports position detection of an electromagnetic induction pen by the EMR system.

Figure 21:
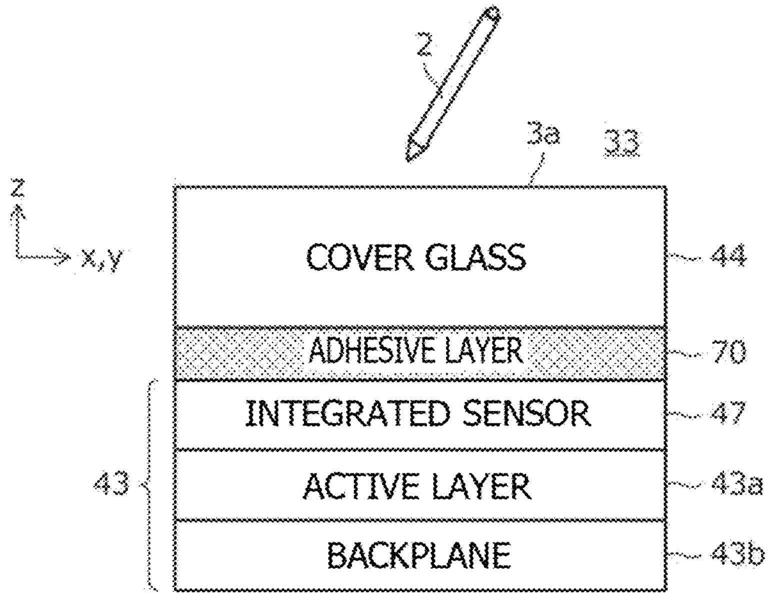
FIG. 21 is a diagram illustrating a layered structure of the structural body included in a position detecting device according to a fourth embodiment of the present disclosure.

A position detection system 1 according to a fourth embodiment of the present disclosure will next be described. FIG. 21 is a diagram illustrating a layered structure of the structural body 33 included in a position detecting device 3 according to the present embodiment. As illustrated in the figure, the position detection system 1 according to the present embodiment is different from the position detection system 1 according to the third embodiment in that an integrated sensor 47 (integrated sensor layer) is provided on the upper surface of the display image generating layer 43*a* in place of the Rx electrode layer 42R including the touch sensor 41, and in that the Tx electrode layer 42T is not provided in the same layer as the backplane 43*b*. The integrated sensor 47 is one obtained by integrating the touch sensor 41 and the EMR sensor 42 with each other. The integrated sensor 47 plays the roles of both the touch sensor 41 and the EMR sensor 42. The position detection system 1 according to the present embodiment is otherwise similar to the position detection system 1 according to the third embodiment. Thus, in the following, the description will be continued with attention directed to differences from the position detection system 1 according to the third embodiment.

Figure 22:
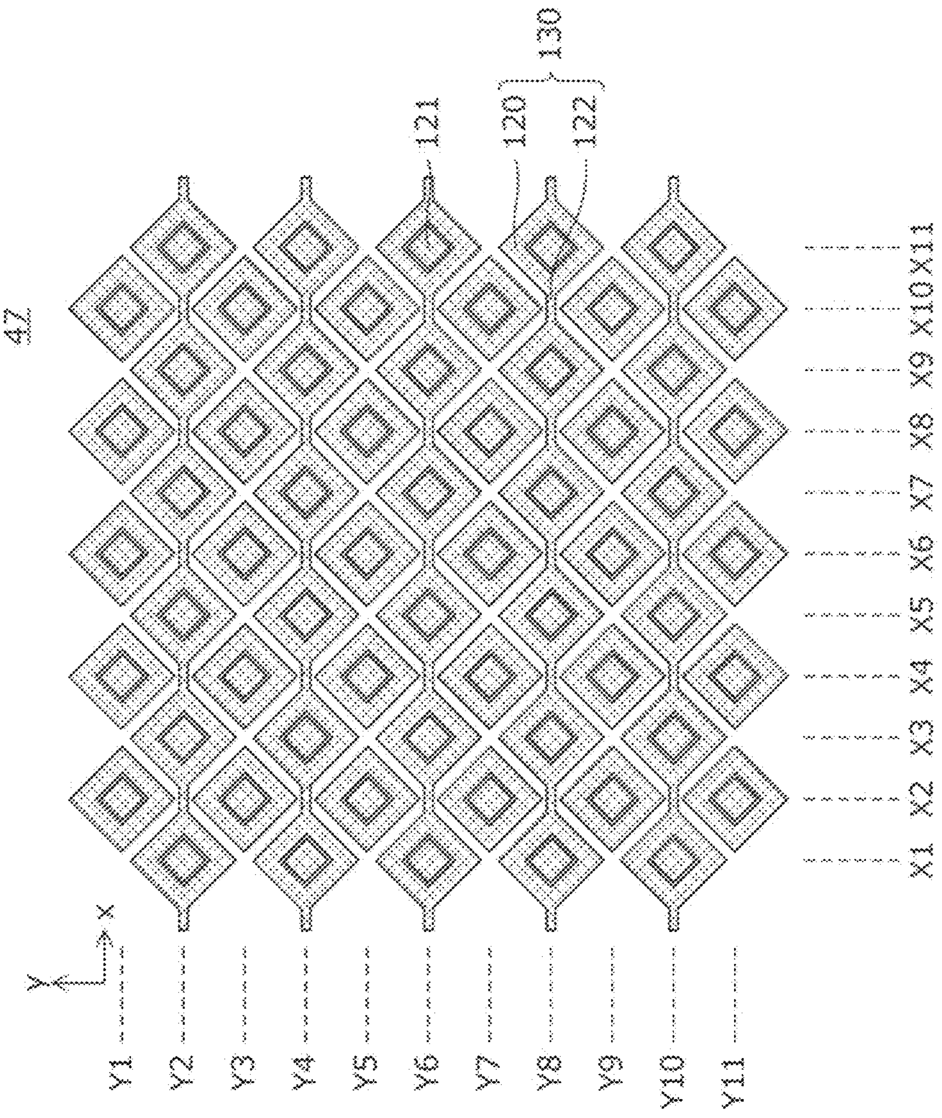
FIG. 22 is a diagram illustrating a planar configuration of an integrated sensor illustrated in FIG. 21.
Figure 23:
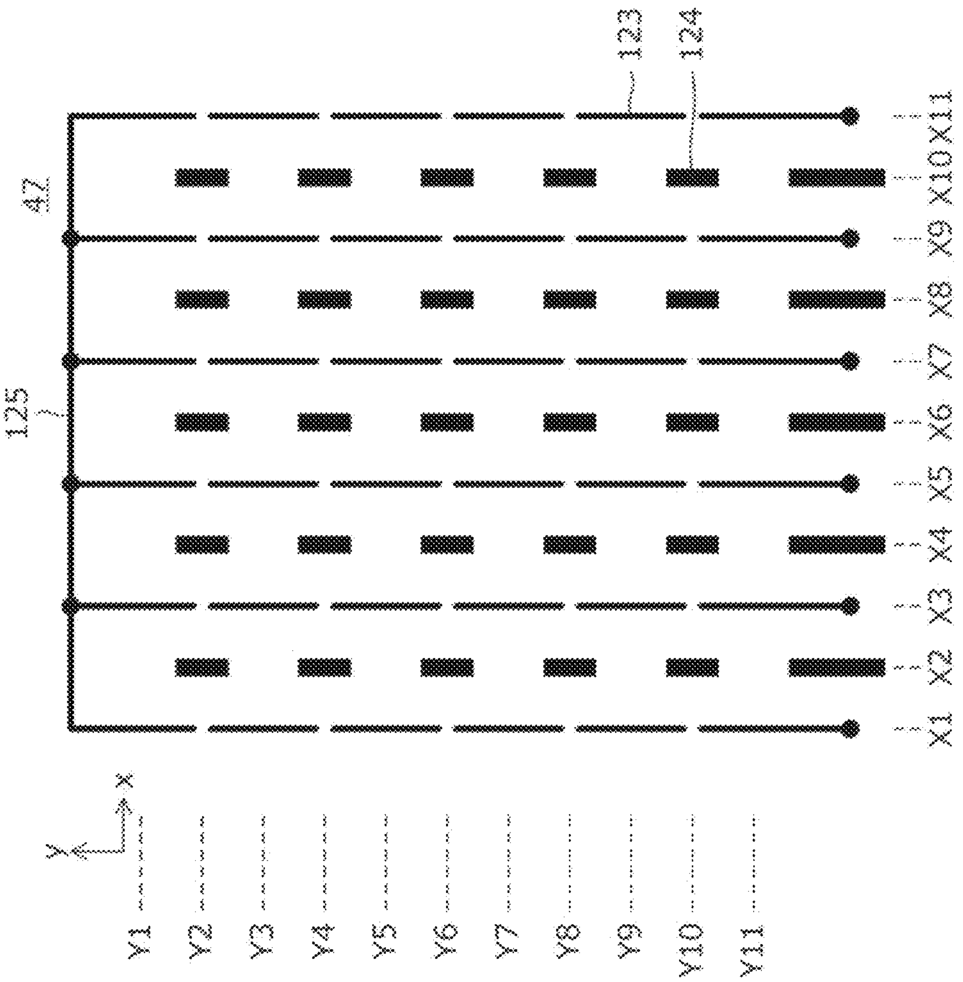
FIG. 23 is a diagram illustrating a planar configuration of the integrated sensor illustrated in FIG. 21.
Figure 24:
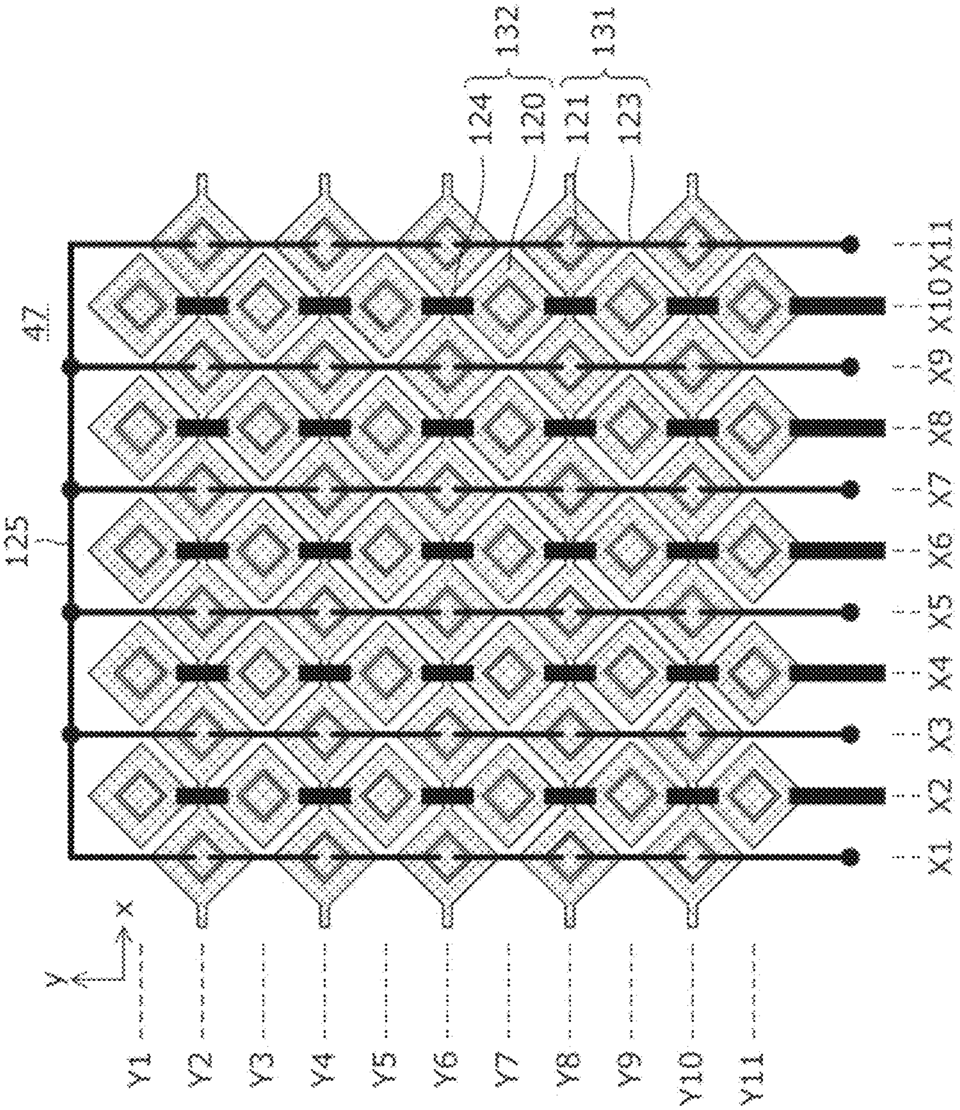
FIG. 24 is a diagram illustrating a planar configuration of the integrated sensor illustrated in FIG. 21.

FIGS. 22 to 24 are diagrams illustrating a planar configuration of the integrated sensor 47. The integrated sensor 47 according to the present embodiment is formed by using two layers. FIG. 22 illustrates a configuration of a lower layer. FIG. 23 illustrates a configuration of an upper layer. In addition, FIG. 24 illustrates the two layers in a superimposed state.

Referring first to FIG. 22, in the lower layer, a plurality of mesh electrodes 120 each having a square shape are most densely arranged in a lattice manner in a state of being inclined by 45 degrees with respect to each of the x-direction and the y-direction. A hollow portion in a square shape is provided within each of the mesh electrodes 120. A mesh electrode 121 in a square shape is disposed in the hollow portion. The mesh electrodes 120 adjacent to one another as well as the mesh electrodes 120 and the mesh electrodes 121 present in the mesh electrodes 120 are insulated from one another by providing a slight gap. In the following, suppose that columns of the mesh electrodes 120 most densely arranged in a lattice manner are identified by X-coordinates (X1 to X11) illustrated in the figure, and that rows thereof are identified by Y-coordinates (Y1 to Y11) illustrated in the figure.

Mesh electrodes 120 belonging to even-numbered rows (that is, rows having Y-coordinates of Y2, Y4, Y6, Y8, and Y10) are mutually connected to other mesh electrodes 120 adjacent in the x-direction by bridge conductors 122 as mesh electrodes extending in the x-direction. Each of the bridge conductors 122 is integrated with two mesh electrodes 120 adjacent in the x-direction, whereas each of the bridge conductors 122 is insulated from two mesh electrodes 120 adjacent in the y-direction by providing slight gaps. The above configuration forms a mesh conductor 130 extending in the x-direction in each of the even-numbered rows of the mesh electrodes 120.

Referring next to FIG. 23, the upper layer is provided with jumper wires 123 and 124 and a connecting wire 125. The jumper wires 123 are respectively formed by a plurality of linear conductors extending along odd-numbered columns (that is, columns having X-coordinates of X1, X3, X5, X7, X9, and X11) of the mesh electrodes 120. However, the respective linear conductors constituting the jumper wires 123 are cut with small gaps at positions corresponding to the even-numbered rows of the mesh electrodes 120. The respective linear conductors constituting the jumper wires 123 are connected to each other by the connecting wire 125 at end portions of parts of the linear conductors provided at first end in the y-direction.

The jumper wires 124 are respectively formed by a plurality of linear conductors extending along even-numbered columns (that is, columns having X-coordinates of X2, X4, X6, X8, and X10) of the mesh electrodes 120. However, the respective linear conductors constituting the jumper wires 124 are cut with large gaps at positions corresponding to odd-numbered rows (that is, rows having Y-coordinates of Y1, Y3, Y5, Y7, Y9, and Y11) of the mesh electrodes 120.

Referring next to FIG. 24, it is understood that the jumper wires 123 play a role of connecting a plurality of mesh electrodes 121 arranged in the odd-numbered columns to one another, and that the jumper wires 124 play a role of connecting mesh electrodes 120 arranged in the even-numbered columns to one another. Connections between the jumper wires 123 and the mesh electrodes 121 and connections between the jumper wires 124 and the mesh electrodes 120 are established by via conductors not illustrated in the figure. The plurality of mesh electrodes 121 arranged in the odd-numbered columns constitute respective tooth portions 131 of a comb-shaped coil by being connected to one another by the jumper wires 123. A base portion of the comb-shaped coil is formed by the connecting wire 125. In addition, the plurality of mesh electrodes 120 arranged in the even-numbered columns constitute linear conductors 132 extending in the y-direction by being connected to one another by the jumper wires 124.

Here, the term "jumper wire" is used in the present embodiment. However, in some pieces of literature, a wire having a role of connecting wires in another layer to each other as in the case of the "jumper wire" according to the present embodiment may be referred to by other terms such as a "bridge wire" and a "connecting conductor." The "jumper wire" according to the present embodiment includes the "bridge wire" and the "connecting conductor" in such a sense.

In addition, in the above description, the jumper wires 123 have been described as playing a role of connecting the plurality of mesh electrodes 121 arranged in the odd-numbered columns to one another. However, conversely, the plurality of mesh electrodes 121 arranged in the odd-numbered column can also be said to play a role of connecting the plurality of jumper wires 123 to one another. In such a sense, the plurality of mesh electrodes 121 arranged in the odd-numbered columns can also be said to be "jumper wires," "bridge wires," or "connecting conductors." Similarly, the plurality of mesh electrodes 120 arranged in the even-numbered columns can also be said to play a role of connecting the plurality of jumper wires 124 to one another. In such a sense, the plurality of mesh electrodes 120 arranged in the even-numbered columns can also be said to be "jumper wires," "bridge wires," or "connecting conductors."

Figure 25:
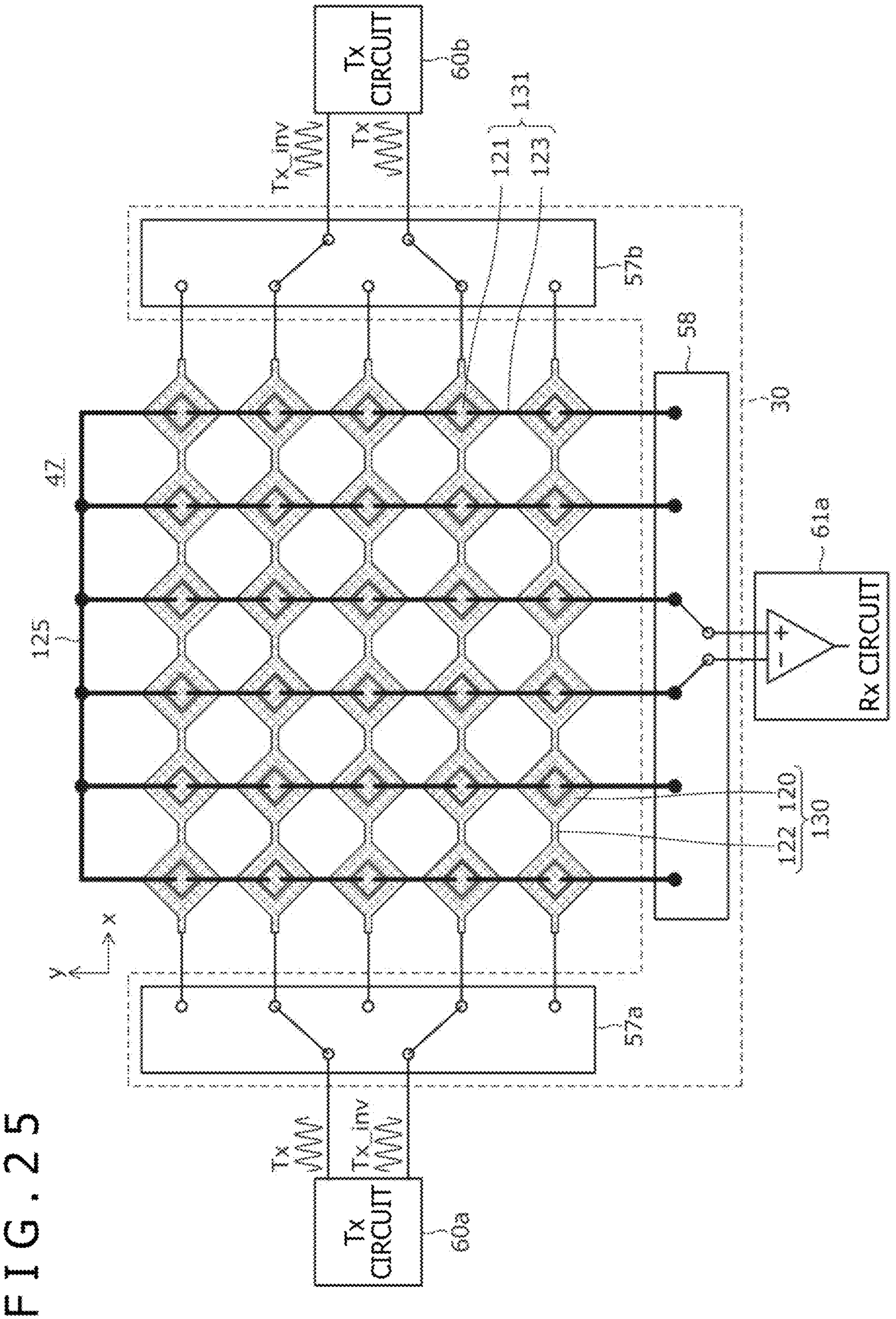
FIG. 25 is a diagram illustrating an electric configuration of the integrated sensor illustrated in FIG. 21.
Figure 26:
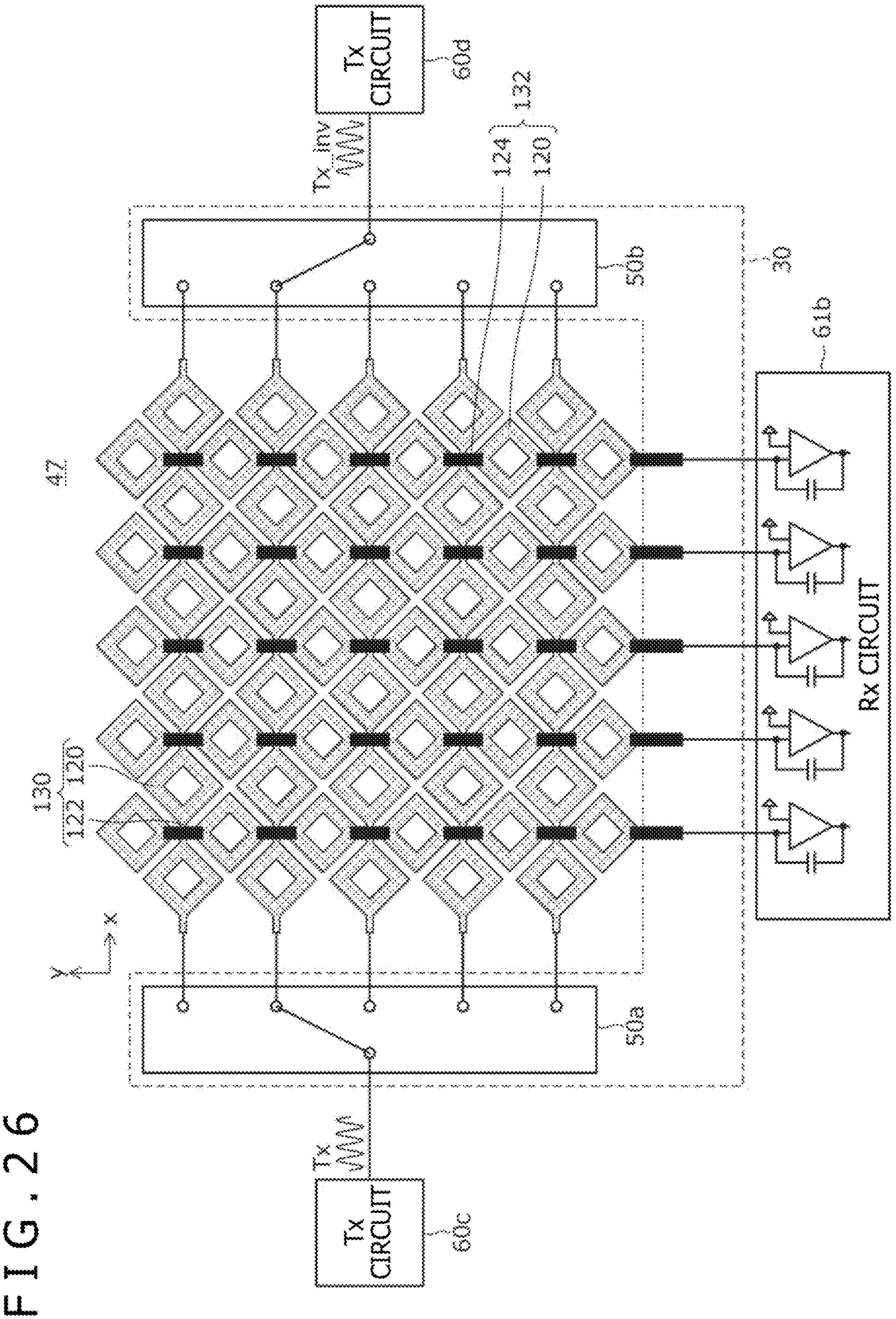
FIG. 26 is a diagram illustrating an electric configuration of the integrated sensor illustrated in FIG. 21.

FIG. 25 and FIG. 26 are diagrams illustrating electric configurations of the integrated sensor 47. FIG. 25 illustrates a configuration related to a case where the integrated sensor 47 is used as an EMR sensor. FIG. 26 illustrates a configuration related to a case where the integrated sensor 47 is used as a touch sensor.

Referring first to FIG. 25, in order to use the integrated sensor 47 as an EMR sensor, the switch circuit 30 includes switches 57*a*, 57*b*, and 58. In addition, the sensor controller 31 includes Tx circuits 60*a* and 60*b* and an Rx circuit 61*a*. The Tx circuits 60*a* and 60*b* each have output terminals of the alternating currents Tx and Tx_inv described with reference to FIG. 7. The Rx circuit 61*a* includes a differential amplifier having a non-inverting input terminal and an inverting input terminal.

The switch 57*a* is a double-pole multiple-throw switch including a first common terminal connected to the output terminal of the alternating current Tx of the Tx circuit 60*a*, a second common terminal connected to the output terminal of the alternating current Tx_inv of the Tx circuit 60*a*, and a plurality of selection terminals connected to first ends of the plurality of mesh conductors 130, respectively. The switch 57*b* is a double-pole multiple-throw switch including a first common terminal connected to the output terminal of the alternating current Tx_inv of the Tx circuit 60*b*, a second common terminal connected to the output terminal of the alternating current Tx of the Tx circuit 60*b*, and a plurality of selection terminals connected to second ends of the plurality of mesh conductors 130, respectively. The switch 58 is a double-pole multiple-throw switch including a first common terminal and a second common terminal respectively connected to the non-inverting input terminal and the inverting input terminal of the differential amplifier disposed within the Rx circuit 61*a* and a plurality of selection terminals connected to second ends (end portions on an opposite side from end portions connected to the connecting wire 125) of the plurality of tooth portions 131, respectively.

In a case of deriving the position of the electromagnetic induction pen 2 by using the integrated sensor 47, the sensor controller 31 first selects one mesh conductor 130, connects, in the switch 57*a*, a selection terminal corresponding to a mesh conductor 130 adjacent on one side to the selected mesh conductor 130 to the first common terminal and a selection terminal corresponding to a mesh conductor 130 adjacent on another side to the selected mesh conductor 130 to the second common terminal. In addition, the sensor controller 31 similarly connects, also in the switch 57*b*, a selection terminal corresponding to the mesh conductor 130 adjacent on the one side to the selected mesh conductor 130 to the first common terminal and a selection terminal corresponding to the mesh conductor 130 adjacent on the other side to the selected mesh conductor 130 to the second common terminal.

Thereafter, the sensor controller 31 starts the output of the alternating currents Tx and Tx_inv from each of the Tx circuits 60*a* and 60*b*. Alternating currents in opposite directions thereby flow on both sides of the selected mesh conductor 130. Consequently, a virtual Tx coil having the selected mesh conductor 130 as a center thereof is formed, and an alternating magnetic field is sent out. After the passage of a specified time from the start of the output of the alternating currents Tx and Tx_inv, the sensor controller 31 stops the output of the alternating currents Tx and Tx_inv, and by controlling the switch 58, the sensor controller 31 connects one of two tooth portions 131 adjacent to each other to the non-inverting input terminal of the differential amplifier within the Rx circuit 61*a* and the other to the inverting input terminal of the differential amplifier within the Rx circuit 61*a*. Consequently, the two tooth portions 131 connected to the differential amplifier within the Rx circuit 61*a* and the part of the connecting wire 125 connecting these tooth portions to each other constitute a virtual Rx coil, and a pen signal generated by a pen alternating magnetic field sent out by the electromagnetic induction pen 2 in response to the above-described alternating magnetic field is output from an output terminal of the differential amplifier.

The sensor controller 31 obtains the strength of the pen signal (strength of the pen alternating magnetic field) at each point of intersection of the virtual Tx coil and the virtual Rx coil by performing the above processing while changing a combination of the selected mesh conductor 130 and the tooth portions 131 connected to the differential amplifier within the Rx circuit 61*a*. Then, the position of the electromagnetic induction pen 2 within the panel surface 3*a* is derived on the basis of a two-dimensional distribution of the obtained strength of the pen signal.

Referring next to FIG. 26, in order to use the integrated sensor 47 as a touch sensor, the switch circuit 30 includes switches 50*a* and 50*b*. In addition, the sensor controller 31 includes Tx circuits 60*c* and 60*d* and an Rx circuit 61*b*. The Tx circuit 60*c* is configured to be able to output an alternating current Tx. The Tx circuit 60*d* is configured to be able to output an alternating current Tx_inv generated by inverting the phase of the alternating current Tx. Incidentally, the alternating currents Tx and Tx_inv referred to here may be the same as or different from the alternating currents Tx and Tx_inv described above (alternating currents for the EMR sensor). In addition, the Rx circuit 61*b* includes an inverting amplifier circuit for each linear conductor 132. This inverting amplifier circuit may be the same as the inverting amplifier circuits 90 illustrated in FIG. 8. An input terminal of each inverting amplifier circuit is connected to first end of the corresponding linear conductor 132.

The switch 50*a* is a single-pole multiple-throw switch including a common terminal connected to the output terminal of the alternating current Tx of the Tx circuit 60*c* and a plurality of selection terminals connected to first ends of the plurality of mesh conductors 130, respectively. The switch 50*b* is a single-pole multiple-throw switch including a common terminal connected to the output terminal of the alternating current Tx_inv of the Tx circuit 60*d* and a plurality of selection terminals connected to second ends of the plurality of mesh conductors 130, respectively.

In a case of deriving the position of the finger by using the integrated sensor 47, the sensor controller 31 first selects one mesh conductor 130, and connects a selection terminal corresponding to the selected mesh conductor 130 to the common terminal in each of the switches 50*a* and 50*b*.

Next, the sensor controller 31 simultaneously starts the output of the alternating current Tx from the Tx circuit 60*c* and the output of the alternating current Tx_inv from the Tx circuit 60*d*. While this output is continued, the sensor controller 31 obtains the strength of a signal output from each inverting amplifier circuit within the Rx circuit 61*b* (which signal will hereinafter be referred to as a "finger touch detection signal").

The sensor controller 31 obtains the strength of the finger touch detection signal at each of points of intersection of the mesh conductors 130 and the linear conductors 132 by performing the above processing while changing the selected mesh conductor 130. Then, the sensor controller 31 derives the position of the finger within the panel surface 3*a* on the basis of a two-dimensional distribution of the obtained strength of the finger touch detection signal.

As described above, according to the position detecting device 3 in accordance with the present embodiment, the integrated sensor 47 that functions as both the EMR sensor and the touch sensor can be formed in two layers. A reduction in thickness of the structural body 33 including the touch sensor and the EMR sensor can therefore be achieved at a level equal to that of the position detecting device 3 described in the third embodiment (position detecting device 3 illustrated in FIG. 18), for example.

In addition, the integrated sensor 47 in the present embodiment can also be applied to the structural body 33 described in the first embodiment. In that case, each wire of the integrated sensor 47 can be precisely positioned with respect to the folding axis BA. It is therefore possible to provide a position detecting device that includes a foldable display and supports position detection of an electromagnetic induction pen by the EMR system.

Incidentally, while an example of forming the integrated sensor 47 in two layers has been described in the present embodiment, the integrated sensor 47 may of course be formed in three layers. For example, the Tx coils and the Rx coils constituting the EMR sensor may be provided in a first layer and a second layer, respectively, the Tx electrodes and the Rx electrodes constituting the touch sensor may both be provided in a third layer, and at intersection parts of the Tx electrodes and the Rx electrodes, either of the Tx electrodes and the Rx electrodes may be bypassed to the second layer by using connecting wires provided in the second layer.

Figure 27:
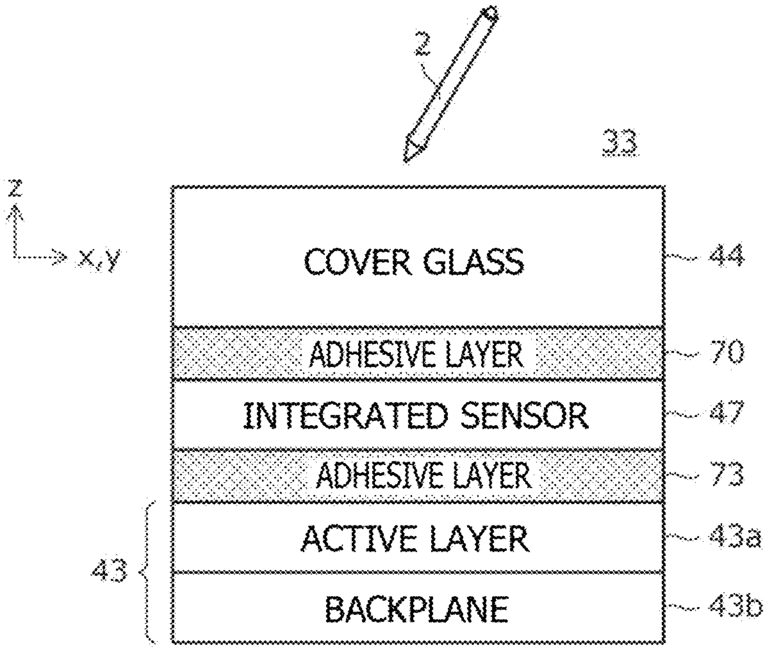
FIG. 27 is a diagram illustrating a layered structure of the structural body included in a position detecting device according to a first modification of the fourth embodiment of the present disclosure.

FIG. 27 is a diagram illustrating a layered structure of the structural body 33 included in a position detecting device 3 according to a first modification of the present embodiment. The position detecting device 3 according to the present modification is different from the position detecting device 3 according to the present embodiment in that the integrated sensor 47 is disposed outside (on the upper side) of the display 43 rather than in the display 43. The integrated sensor 47 and the display 43 are bonded to each other by an adhesive layer 73. As with the position detecting device 3 according to the present embodiment, this configuration can achieve a reduction in thickness of the structural body 33 including the touch sensor and the EMR sensor.

Figure 28:
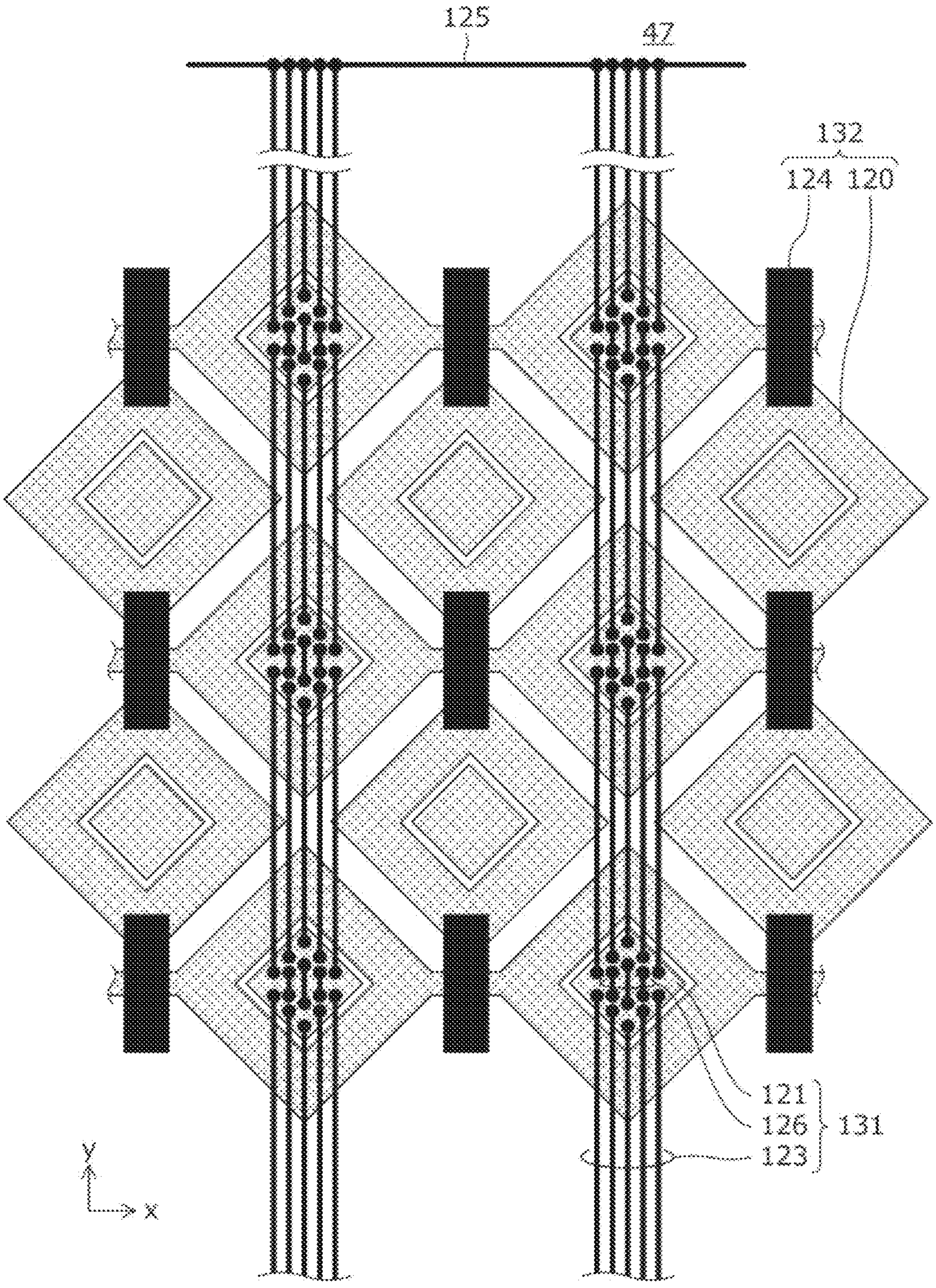
FIG. 28 is a diagram illustrating a planar configuration of an integrated sensor according to a second modification of the fourth embodiment of the present disclosure.

FIG. 28 is a diagram illustrating a planar configuration of the integrated sensor 47 according to a second modification of the present embodiment. The figure corresponds to an enlarged view of a part of the integrated sensor 47 illustrated in FIG. 24. As is understood by comparing the figure with FIG. 24, the position detecting device 3 according to the present modification is different from the position detecting device 3 according to the present embodiment in that one set of mesh electrodes 121 are connected to one another by a plurality of jumper wires 123 running side by side and in that a plurality of bypass wires 126 are provided at positions corresponding to the inside of each mesh electrode 121 as viewed in plan. The bypass wires 126 are wires provided in the same layer as the jumper wires 123. Circular parts provided to end portions of each jumper wire 123 and each bypass wire 126 in FIG. 28 indicate the positions of via conductors connecting the jumper wire 123 or the bypass wire 126 to the mesh electrode(s) 121. This can make the wiring resistance of the virtual Rx coil constituted by the tooth portions 131 and the connecting wire 125 lower than in the case of the present embodiment.

In the following, preferable configuration examples of the position detecting device, the sensor, and the display according to the embodiments will be described collectively. The position detecting device, the sensor, and the display according to the present embodiment are preferably configured as in configurations A1 to A14, B1 to B7, C1 to C3, D1 to D10, E1 to E7, F1 to F6, G1, H1, I1, J1, K1, L1, M1, N1, O1 to O14, P1 to P7, Q1 to Q9, R1 to R8, S1, T1, U1, V1, X1, Y1, Z1, and AA1 illustrated in the following.

Configuration A1

A position detecting device for detecting a position of a pen on a panel surface by electromagnetic induction action, the position detecting device including:

- a display image generating layer that generates a display image according to control of a driving circuit;
- a Tx electrode layer in which a Tx electrode that generates an alternating magnetic field is disposed; and
- an Rx electrode layer in which a plurality of Rx electrodes that detect a pen alternating magnetic field generated by the pen that stores electric power according to the alternating magnetic field are disposed, the Rx electrode layer being on an opposite side from a side provided with the Tx electrode layer with the display image generating layer as a center.

Configuration A2

The position detecting device according to Configuration A1, in which the Tx electrode constitutes a plurality of Tx coils arranged side by side in a first direction, and the plurality of Rx electrodes constitute a plurality of Rx coils juxtaposed in a second direction intersecting the first direction.

Configuration A3

The position detecting device according to Configuration A2, including:

an integrated circuit that derives coordinates of the pen on the basis of strength of the pen alternating magnetic field at each of points of intersection of the plurality of Tx coils and the plurality of Rx coils, the pen alternating magnetic field being sent out by the pen in response to the alternating magnetic field.

Configuration A4

The position detecting device according to Configuration A1, in which the plurality of Rx electrodes are formed in one layer on one surface of the display image generating layer.

Configuration A5

The position detecting device according to Configuration A4, in which the plurality of Rx electrodes are formed by a plurality of coil-shaped electrodes not overlapping each other.

Configuration A6

The position detecting device according to Configuration A5, in which the plurality of coil-shaped electrodes each include a transparent part formed by a transparent conductor.

Configuration A7

The position detecting device according to Configuration A5, in which the plurality of coil-shaped electrodes each include a mesh electrode having a repetition of a predetermined local pattern.

Configuration A8

The position detecting device according to Configuration A7, in which coil-shaped electrodes other than a first coil-shaped electrode and a second coil-shaped electrode located at both ends among the plurality of coil-shaped electrodes include two mesh electrodes extended in parallel with each other.

Configuration A9

The position detecting device according to Configuration A8, in which the coil-shaped electrodes other than the first coil-shaped electrode and the second coil-shaped electrode among the plurality of coil-shaped electrodes each include a connecting wire connecting the two mesh electrodes to each other, the connecting wire being outside an active area that displays the display image.

Configuration A10

The position detecting device according to Configuration A7, in which a first coil-shaped electrode and a second coil-shaped electrode located at both ends among the plurality of coil-shaped electrodes each include an opaque metallic conductor extended in parallel with the mesh electrode.

Configuration A11

The position detecting device according to Configuration A1, in which the Tx electrode is formed in one layer.

Configuration A12

The position detecting device according to Configuration A11, in which the Tx electrode is a comb-shaped coil having a configuration formed by connecting respective first ends of a plurality of tooth portions each extending in a second direction to a base portion extending in a first direction intersecting the second direction.

Configuration A13

The position detecting device according to Configuration A12, in which the comb-shaped coil includes a first comb-shaped coil disposed on one side of a folding axis of a display including the display image generating layer and a second comb-shaped coil disposed on another side of the folding axis, and the base portion of the first comb-shaped coil and the base portion of the second comb-shaped coil are connected to each other by a connecting conductor extended so as to straddle the folding axis.

Configuration A14

The position detecting device according to Configuration A1, including:

a support plate, in which the Tx electrode is formed in one layer on one surface of the support plate.

Configuration B1

A position detecting device for detecting a position of a pen on a panel surface by electromagnetic induction action, the position detecting device including:

a display image generating layer that generates a display image according to control of a driving circuit;

a Tx electrode layer in which a Tx electrode that generates an alternating magnetic field is disposed; and an Rx electrode layer in which a plurality of Rx electrodes that detect a pen alternating magnetic field generated by the pen that stores electric power according to the alternating magnetic field are disposed, the plurality of Rx electrodes being formed in one layer on one surface of the display image generating layer.

Configuration B2

The position detecting device according to Configuration B1, in which the plurality of Rx electrodes are formed by a plurality of coil-shaped electrodes not overlapping each other.

Configuration B3

The position detecting device according to Configuration B2, in which the plurality of coil-shaped electrodes each include a transparent part formed by a transparent conductor.

Configuration B4

The position detecting device according to Configuration B2, in which the plurality of coil-shaped electrodes each include a mesh electrode having a repetition of a predetermined local pattern.

Configuration B5

The position detecting device according to Configuration B4, in which coil-shaped electrodes other than a first coil-shaped electrode and a second coil-shaped electrode located at both ends among the plurality of coil-shaped electrodes include two mesh electrodes extended in parallel with each other.

Configuration B6

The position detecting device according to Configuration B5, in which the coil-shaped electrodes other than the first coil-shaped electrode and the second coil-shaped electrode among the plurality of coil-shaped electrodes each include a connecting wire connecting the two mesh electrodes to each other, the connecting wire being outside an active area that displays the display image.

Configuration B7

The position detecting device according to Configuration B4, in which a first coil-shaped electrode and a second coil-shaped electrode located at both ends among the plurality of coil-shaped electrodes each include an opaque metallic conductor extended in parallel with the mesh electrode.

Configuration C1

A position detecting device for detecting a position of a pen on a panel surface by electromagnetic induction action, the position detecting device including:

a display image generating layer that generates a display image according to control of a driving circuit;

a Tx electrode layer in which a Tx electrode that generates an alternating magnetic field is disposed;

an Rx electrode layer in which a plurality of Rx electrodes that detect a pen alternating magnetic field generated by the pen that stores electric power according to the alternating magnetic field are disposed; and a support plate disposed at a position more distant from the panel surface than the display image generating layer, the Tx electrode being formed in one layer on one surface of the support plate.

Configuration C2

The position detecting device according to Configuration C1, in which the Tx electrode is a comb-shaped coil having a configuration formed by connecting respective first ends of a plurality of tooth portions each extending in a second direction to a base portion extending in a first direction intersecting the second direction.

Configuration C3

The position detecting device according to Configuration C2, in which the support plate includes a first support plate disposed on one side of a folding axis of a display including the display image generating layer and a second support plate disposed on another side of the folding axis, the comb-shaped coil includes a first comb-shaped coil formed on one surface of the first support plate and a second comb-shaped coil formed on one surface of the second support plate, and the base portion of the first comb-shaped coil and the base portion of the second comb-shaped coil are connected to each other by a connecting conductor extended so as to straddle the folding axis.

Configuration D1

A position detecting device for detecting positions of a pen and a finger on a panel surface, the position detecting device including:

a display image generating layer that generates a display image according to control of a driving circuit; and an integrated sensor layer disposed between the panel surface and the display image generating layer, the integrated sensor layer including a touch sensor for detecting the position of the finger on the panel surface by a capacitive system and an EMR sensor for detecting the position of the pen on the panel surface by electromagnetic induction action, the touch sensor including a plurality of first electrodes arranged side by side in a first direction and a plurality of second electrodes arranged side by side in a second direction intersecting the first direction, the EMR sensor including a plurality of first coils arranged side by side in the first direction and a plurality of second coils arranged side by side in the second direction, and at least a part of each of the plurality of second electrodes being formed in the same layer as the plurality of first coils or the plurality of second coils.

Configuration D2

The position detecting device according to Configuration D1, in which the integrated sensor layer is formed in two layers or three layers.

Configuration D3

The position detecting device according to Configuration D1, in which the plurality of first coils are formed in a first layer, and the plurality of second electrodes each have a configuration in which a part formed in the first layer and a part formed in a second layer different from the first layer are connected to each other by a via conductor.

Configuration D4

The position detecting device according to Configuration D3, in which the part formed in the first layer in the second electrode is a connecting conductor that connects a plurality of parts formed in the second layer in the second electrode.

Configuration D5

The position detecting device according to Configuration D4, in which the connecting conductor is a jumper wire or a bridge wire.

Configuration D6

The position detecting device according to Configuration D3, in which the plurality of second coils each have a configuration in which a part formed in the first layer and a part formed in the second layer are connected to each other by a via conductor.

Configuration D7

The position detecting device according to Configuration D4, in which the part formed in the first layer in the second coil is a connecting conductor that connects a plurality of parts formed in the second layer in the second coil, and the connecting conductor is formed in the same layer as at least a part of the plurality of second electrodes.

Configuration D8

The position detecting device according to Configuration D6, in which the plurality of second electrodes and the plurality of second coils are extended so as not to overlap each other as viewed in plan.

Configuration D9

The position detecting device according to any one of Configuration D6 to Configuration D8, in which the plurality of second electrodes and the plurality of second coils are alternately extended as viewed in the second direction.

Configuration D10

The position detecting device according to Configuration D3, in which the plurality of first electrodes and the plurality of first coils are formed by the same wiring formed in the first layer.

Configuration E1

A position detecting device for detecting positions of a pen and a finger on a panel surface, the position detecting device including:

a display image generating layer that generates a display image according to control of a driving circuit; and an integrated sensor layer disposed between the panel surface and the display image generating layer, the integrated sensor layer including a touch sensor for detecting the position of the finger on the panel surface by a capacitive system and an EMR sensor for detecting the position of the pen on the panel surface by electromagnetic induction action, the touch sensor including a plurality of first electrodes arranged side by side in a first direction and a plurality of second electrodes arranged side by side in a second direction intersecting the first direction, the EMR sensor including a plurality of first coils arranged side by side in the first direction and a plurality of second coils arranged side by side in the second direction, and the plurality of second coils being formed by a comb-shaped coil having a configuration formed by connecting respective first ends of a plurality of tooth portions each extending in the first direction to a base portion extending in the second direction.

Configuration E2

The position detecting device according to Configuration E1, in which the integrated sensor layer is formed in two layers or three layers.

Configuration E3

The position detecting device according to Configuration E1, in which the plurality of first coils are formed in a first layer, and the plurality of second electrodes each have a configuration in which a part formed in the first layer and a part formed in a second layer different from the first layer are connected to each other by a via conductor.

Configuration E4

The position detecting device according to Configuration E1, in which the plurality of tooth portions have a configuration in which a part formed in a first layer and a part formed in a second layer are connected to each other by a via conductor.

Configuration E5

The position detecting device according to Configuration E4, in which the plurality of second electrodes and the plurality of tooth portions are extended so as not to overlap each other as viewed in plan.

Configuration E6

The position detecting device according to Configuration E4 or E5, in which the plurality of second electrodes and the plurality of tooth portions are alternately extended as viewed in the second direction.

Configuration E7

The position detecting device according to Configuration E1, in which the plurality of first electrodes and the plurality of first coils are formed by the same wiring formed in the first layer.

Configuration F1

A position detecting device for detecting a position of a pen on a panel surface by electromagnetic induction action, the position detecting device including:

a plurality of first electrodes each having a hollow portion and arranged in a lattice manner;

a plurality of second electrodes arranged within the hollow portions of the plurality of first mesh electrodes, respectively; and a plurality of first connecting wires that are formed in a layer different from a layer of the plurality of first electrodes and the plurality of second electrodes, and constitute a plurality of first wires extending in a first direction by mutually connecting two second electrodes adjacent to each other in the first direction, the plurality of first wires constituting a receiving coil of an EMR sensor for detecting the position of the pen on the panel surface by the electromagnetic induction action.

Configuration F2

The position detecting device according to Configuration F1, including:

a second connecting wire that mutually connects first ends of the plurality of first wires, in which the plurality of first wires each constitute a tooth portion of a comb-shaped coil, and the second connecting wire constitutes a base portion of the comb-shaped coil.

Configuration F3

The position detecting device according to Configuration F1 or F2, further including:

a plurality of third connecting wires that are formed in the same layer as the plurality of first electrodes, and constitute a plurality of second wires extending in a second direction intersecting the first direction by mutually connecting two first electrodes adjacent to each other in the second direction, in which the plurality of second wires constitute a transmitting coil of the EMR sensor for detecting the position of the pen on the panel surface by the electromagnetic induction action.

Configuration F4

The position detecting device according to Configuration F3, including:

a plurality of third electrodes arranged in a lattice manner; and a plurality of fourth connecting wires that are formed in a layer different from the layer of the plurality of first electrodes, the plurality of second electrodes, and the plurality of third electrodes, and constitute a plurality of third wires extending in the first direction by mutually connecting two third electrodes adjacent to each other in the first direction, in which the plurality of third wires constitute a receiving electrode of a touch sensor for detecting the position of a finger on the panel surface by a capacitive system, and the plurality of second wires are used also as a transmitting electrode of the touch sensor.

Configuration F5

The position detecting device according to Configuration F1, further including:

a display image generating layer that generates a display image according to control of a driving circuit, in which the plurality of first electrodes, the plurality of second electrodes, and the first connecting wires are arranged between the panel surface and the display image generating layer.

Configuration F6

The position detecting device according to Configuration F5, in which the plurality of first electrodes and the plurality of second electrodes are mesh electrodes.

Configuration G1

A sensor for use in conjunction with an electronic apparatus that detects positions of a pen and a finger on a panel surface, the electronic apparatus including a display image generating layer that generates a display image according to control of a driving circuit, the sensor being disposed between the panel surface and the display image generating layer, and including a touch sensor for detecting the position of the finger on the panel surface by a capacitive system and an EMR sensor for detecting the position of the pen on the panel surface by electromagnetic induction action, the touch sensor including a plurality of first electrodes arranged side by side in a first direction and a plurality of second electrodes arranged side by side in a second direction intersecting the first direction, the EMR sensor including a plurality of first coils arranged side by side in the first direction and a plurality of second coils arranged side by side in the second direction, and at least a part of each of the plurality of second electrodes being formed in the same layer as the plurality of first coils or the plurality of second coils.

Configuration H1

A sensor for use in conjunction with an electronic apparatus that detects positions of a pen and a finger on a panel surface, the sensor including a touch sensor for detecting the position of the finger on the panel surface by a capacitive system and an EMR sensor for detecting the position of the pen on the panel surface by electromagnetic induction action, the touch sensor including a plurality of first electrodes arranged side by side in a first direction and a plurality of second electrodes arranged side by side in a second direction intersecting the first direction, the EMR sensor including a plurality of first coils arranged side by side in the first direction and a plurality of second coils arranged side by side in the second direction, and at least a part of each of the plurality of second electrodes being formed in the same layer as the plurality of first coils or the plurality of second coils.

Configuration I1

A sensor for use in conjunction with an electronic apparatus that detects positions of a pen and a finger on a panel surface, the electronic apparatus including a display image generating layer that generates a display image according to control of a driving circuit, the sensor being disposed between the panel surface and the display image generating layer, and including a touch sensor for detecting the position of the finger on the panel surface by a capacitive system and an EMR sensor for detecting the position of the pen on the panel surface by electromagnetic induction action, the touch sensor including a plurality of first electrodes arranged side by side in a first direction and a plurality of second electrodes arranged side by side in a second direction intersecting the first direction, the EMR sensor including a plurality of first coils arranged side by side in the first direction and a plurality of second coils arranged side by side in the second direction, and the plurality of second coils being formed by a comb-shaped coil having a configuration formed by connecting respective first ends of a plurality of tooth portions each extending in the first direction to a base portion extending in the second direction.

Configuration J1

A sensor for use in conjunction with an electronic apparatus that detects positions of a pen and a finger on a panel surface, the sensor including a touch sensor for detecting the position of the finger on the panel surface by a capacitive system and an EMR sensor for detecting the position of the pen on the panel surface by electromagnetic induction action, the touch sensor including a plurality of first electrodes arranged side by side in a first direction and a plurality of second electrodes arranged side by side in a second direction intersecting the first direction, the EMR sensor including a plurality of first coils arranged side by side in the first direction and a plurality of second coils arranged side by side in the second direction, and the plurality of second coils being formed by a comb-shaped coil having a configuration formed by connecting respective first ends of a plurality of tooth portions each extending in the first direction to a base portion extending in the second direction.

Configuration K1

A sensor for use in conjunction with an electronic apparatus for detecting a position of a pen on a panel surface by electromagnetic induction action, the sensor including:

a plurality of first electrodes each having a hollow portion and arranged in a lattice manner;

a plurality of second electrodes arranged within the hollow portions of the plurality of first mesh electrodes, respectively; and a plurality of first connecting wires that are formed in a layer different from a layer of the plurality of first electrodes and the plurality of second electrodes, and constitute a plurality of first wires extending in a first direction by mutually connecting two second electrodes adjacent to each other in the first direction, the plurality of first wires constituting a receiving coil of an EMR sensor for detecting the position of the pen on the panel surface by the electromagnetic induction action.

Configuration L1

A display including:

a display image generating layer that generates a display image according to control of a driving circuit; and a sensor disposed between a panel surface and the display image generating layer, and used to detect a position of a pen on the panel surface by electromagnetic induction action, the sensor including a touch sensor for detecting a position of a finger on the panel surface by a capacitive system and an EMR sensor for detecting the position of the pen on the panel surface by the electromagnetic induction action, the touch sensor including a plurality of first electrodes arranged side by side in a first direction and a plurality of second electrodes arranged side by side in a second direction intersecting the first direction, the EMR sensor including a plurality of first coils arranged side by side in the first direction and a plurality of second coils arranged side by side in the second direction, and at least a part of each of the plurality of second electrodes being formed in the same layer as the plurality of first coils or the plurality of second coils.

Configuration M1

A display including:

a display image generating layer that generates a display image according to control of a driving circuit; and a sensor disposed between a panel surface and the display image generating layer, and used to detect a position of a pen on the panel surface by electromagnetic induction action, the sensor including a touch sensor for detecting a position of a finger on the panel surface by a capacitive system and an EMR sensor for detecting the position of the pen on the panel surface by the electromagnetic induction action, the touch sensor including a plurality of first electrodes arranged side by side in a first direction and a plurality of second electrodes arranged side by side in a second direction intersecting the first direction, the EMR sensor including a plurality of first coils arranged side by side in the first direction and a plurality of second coils arranged side by side in the second direction, and the plurality of second coils being formed by a comb-shaped coil having a configuration formed by connecting respective first ends of a plurality of tooth portions each extending in the first direction to a base portion extending in the second direction.

Configuration N1

A display including:

a display image generating layer that generates a display image according to control of a driving circuit; and a sensor disposed between a panel surface and the display image generating layer and used to detect a position of a pen on the panel surface by electromagnetic induction action, the sensor including a plurality of first electrodes each having a hollow portion and arranged in a lattice manner, a plurality of second electrodes arranged within the hollow portions of the plurality of first mesh electrodes, respectively, and a plurality of first connecting wires that are formed in a layer different from a layer of the plurality of first electrodes and the plurality of second electrodes, and constitute a plurality of first wires extending in a first direction by mutually connecting two second electrodes adjacent to each other in the first direction, and the plurality of first wires constituting a receiving coil of an EMR sensor for detecting the position of the pen on the panel surface by the electromagnetic induction action.

Configuration O1

A position detecting device for detecting a position of a pen on a panel surface by electromagnetic induction action, the position detecting device including:

a display image generating layer that generates a display image according to control of a driving circuit;

a first electrode layer in which one or more first electrodes constituting a plurality of first coils arranged side by side in a first direction are arranged; and a second electrode layer in which one or more second electrodes constituting a plurality of second coils arranged side by side in a second direction intersecting the first direction are arranged, the second electrode layer being on an opposite side from a side provided with the first electrode layer with the display image generating layer as a center.

Configuration O2

The position detecting device according to Configuration O1, in which an alternating magnetic field is sent out from the one or more first electrodes, and a pen alternating magnetic field generated by the pen that stores electric power according to the alternating magnetic field is detected by using the one or more second electrodes.

Configuration O3

The position detecting device according to Configuration O2, including:

an integrated circuit that derives coordinates of the pen on the basis of strength of the pen alternating magnetic field at each of points of intersection of the plurality of first coils and the plurality of second coils, the pen alternating magnetic field being sent out by the pen in response to the alternating magnetic field.

Configuration O4

The position detecting device according to Configuration O1, in which the one or more second electrodes are formed in one layer on one surface of the display image generating layer.

Configuration O5

The position detecting device according to Configuration O4, in which the one or more second electrodes are formed by a plurality of coil-shaped electrodes not overlapping each other.

Configuration O6

The position detecting device according to Configuration O5, in which the plurality of coil-shaped electrodes each include a transparent part formed by a transparent conductor.

Configuration O7

The position detecting device according to Configuration O5, in which the plurality of coil-shaped electrodes each include a mesh electrode having a repetition of a predetermined local pattern.

Configuration O8

The position detecting device according to Configuration O7, in which coil-shaped electrodes other than a first coil-shaped electrode and a second coil-shaped electrode located at both ends among the plurality of coil-shaped electrodes include two mesh electrodes extended in parallel with each other.

Configuration O9

The position detecting device according to Configuration O8, in which the coil-shaped electrodes other than the first coil-shaped electrode and the second coil-shaped electrode among the plurality of coil-shaped electrodes each include a connecting wire connecting the two mesh electrodes to each other, the connecting wire being outside an active area that displays the display image.

Configuration O10

The position detecting device according to Configuration O7, in which a first coil-shaped electrode and a second coil-shaped electrode located at both ends among the plurality of coil-shaped electrodes each include an opaque metallic conductor extended in parallel with the mesh electrode.

Configuration O11

The position detecting device according to Configuration O1, in which the one or more first electrodes are formed in one layer.

Configuration O12

The position detecting device according to Configuration O11, in which the one or more first electrodes are comb-shaped coils having a configuration formed by connecting respective first ends of a plurality of tooth portions each extending in the second direction to a base portion extending in the first direction.

Configuration O13

The position detecting device according to Configuration O12, in which the comb-shaped coil includes a first comb-shaped coil disposed on one side of a folding axis of a display including the display image generating layer and a second comb-shaped coil disposed on another side of the folding axis, and the base portion of the first comb-shaped coil and the base portion of the second comb-shaped coil are connected to each other by a connecting conductor extended so as to straddle the folding axis.

Configuration O14

The position detecting device according to Configuration O1, including:

a support plate, in which the one or more first electrode are formed in one layer on one surface of the support plate.

Configuration P1

A position detecting device for detecting a position of a pen on a panel surface by electromagnetic induction action, the position detecting device including:

a display image generating layer that generates a display image according to control of a driving circuit;

a first electrode layer in which one or more first electrodes constituting a plurality of first coils arranged side by side in a first direction are arranged; and a second electrode layer in which one or more second electrodes constituting a plurality of second coils arranged side by side in a second direction intersecting the first direction are arranged, the one or more second electrodes being formed in one layer on one surface of the display image generating layer.

Configuration P2

The position detecting device according to Configuration P1, in which the one or more second electrodes are formed by a plurality of coil-shaped electrodes not overlapping each other.

Configuration P3

The position detecting device according to Configuration P2, in which the plurality of coil-shaped electrodes each include a transparent part formed by a transparent conductor.

Configuration P4

The position detecting device according to Configuration P2, in which the plurality of coil-shaped electrodes each include a mesh electrode having a repetition of a predetermined local pattern.

Configuration P5

The position detecting device according to Configuration P4, in which coil-shaped electrodes other than a first coil-shaped electrode and a second coil-shaped electrode located at both ends among the plurality of coil-shaped electrodes include two mesh electrodes extended in parallel with each other.

Configuration P6

The position detecting device according to Configuration P5, in which the coil-shaped electrodes other than the first coil-shaped electrode and the second coil-shaped electrode among the plurality of coil-shaped electrodes each include a connecting wire connecting the two mesh electrodes to each other, the connecting wire being outside an active area that displays the display image.

Configuration P7

The position detecting device according to Configuration P4, in which a first coil-shaped electrode and a second coil-shaped electrode located at both ends among the plurality of coil-shaped electrodes each include an opaque metallic conductor extended in parallel with the mesh electrode.

Configuration Q1

A position detecting device for detecting a position of a pen on a panel surface by electromagnetic induction action, the position detecting device including:

a display image generating layer that generates a display image according to control of a driving circuit;

a first electrode layer in which one or more first electrodes constituting a plurality of first coils arranged side by side in a first direction are arranged;

a second electrode layer in which one or more second electrodes constituting a plurality of second coils arranged side by side in a second direction intersecting the first direction are arranged; and a support plate disposed at a position more distant from the panel surface than the display image generating layer, the one or more first electrodes being formed on the support plate.

Configuration Q2

The position detecting device according to Configuration Q1, in which an alternating magnetic field is sent out from the one or more first electrodes, and a pen alternating magnetic field generated by the pen that stores electric power according to the alternating magnetic field is detected by using the one or more second electrodes.

Configuration Q3

The position detecting device according to Configuration Q1, in which an alternating magnetic field is sent out from the one or more second electrodes, and a pen alternating magnetic field generated by the pen that stores electric power according to the alternating magnetic field is detected by using the one or more first electrodes.

Configuration Q4

The position detecting device according to Configuration Q1, in which the one or more first electrodes are a comb-shaped coil having a configuration formed by connecting respective first ends of a plurality of tooth portions each extending in the second direction to a base portion extending in the first direction.

Configuration Q5

The position detecting device according to Configuration Q4, in which the support plate includes a first support plate disposed on one side of a folding axis of a display including the display image generating layer and a second support plate disposed on another side of the folding axis, the comb-shaped coil includes a first comb-shaped coil formed on one surface of the first support plate and a second comb-shaped coil formed on one surface of the second support plate, and the base portion of the first comb-shaped coil and the base portion of the second comb-shaped coil are connected to each other by a connecting conductor extended so as to straddle the folding axis.

Configuration Q6

The position detecting device according to any one of Configuration Q1 to Configuration Q3, in which the one or more first electrodes are formed in one layer on one surface of the support plate, and the one or more second electrodes are formed in one layer on another surface of the support plate.

Configuration Q7

The position detecting device according to Configuration Q6, further including:

a plurality of pads formed on the one surface of the support plate, in which each of the one or more first electrodes is connected to any one of the plurality of pads by wiring within the same plane, and each of the one or more second electrodes is connected to any one of the plurality of pads by a via conductor disposed in the support plate.

Configuration Q8

The position detecting device according to any one of Configuration Q1 to Configuration Q3, in which the one or more first electrodes have a configuration formed by interconnecting a part formed in one layer on one surface of the support plate and a part formed in one layer on another surface of the support plate, by a via conductor disposed in the support plate, and the one or more second electrodes have a configuration formed by interconnecting a part formed in one layer on the one surface of the support plate and a part formed in one layer on the other surface of the support plate, by a via conductor disposed in the support plate.

Configuration Q9

The position detecting device according to Configuration Q8, further including:

a plurality of pads formed on the one surface of the support plate, in which each of the one or more first electrodes is connected to any one of the plurality of pads by wiring formed on the one surface of the support plate, and each of the one or more second electrodes is connected to any one of the plurality of pads by wiring formed on the one surface of the support plate.

Configuration R1

A position detecting device for detecting positions of a pen and a finger on a panel surface, the position detecting device including:

a display image generating layer that generates a display image according to control of a driving circuit; and a plurality of coil-shaped electrodes arranged between the panel surface and the display image generating layer, the plurality of coil-shaped electrodes each having a configuration formed by connecting respective first ends of two conductors extended in parallel with each other along a first direction to each other by a connecting wire extending in a second direction intersecting the first direction, and a conductor extended so as to be stretched in a region displaying the display image as viewed in plan view among the two conductors constituting each of the plurality of coil-shaped electrodes being formed by a mesh electrode or a transparent electrode.

Configuration R2

The position detecting device according to Configuration R1, in which the plurality of coil-shaped electrodes are each formed in a Π-shape.

Configuration R3

The position detecting device according to Configuration R1, in which the plurality of coil-shaped electrodes are electrically separated from each other.

Configuration R4

The position detecting device according to Configuration R1, in which the plurality of coil-shaped electrodes are formed in one layer.

Configuration R5

The position detecting device according to Configuration R1, in which the conductor extended so as to be stretched in the region displaying the display image as viewed in plan view among the two conductors constituting each of the plurality of coil-shaped electrodes and the connecting wire constituting each of the plurality of coil-shaped electrodes are formed by an opaque plate-shaped conductor.

Configuration R6

The position detecting device according to any one of Configuration R1 to Configuration R5, further including:

a switch circuit that grounds a second end of each of the plurality of coil-shaped electrodes in a case where the plurality of coil-shaped electrodes are used as an EMR sensor for detecting the position of the pen on the panel surface by electromagnetic induction action and that mutually connects a first end and the second end of each of the plurality of coil-shaped electrodes in a case where the plurality of coil-shaped electrodes are used as a touch sensor for detecting the position of the finger on the panel surface by a capacitive system.

Configuration R7

The position detecting device according to Configuration R6, in which the plurality of coil-shaped electrodes are each used as a receiving coil of the EMR sensor and a receiving electrode of the touch sensor, and the first end of each of the plurality of coil-shaped electrodes is connected to a receiving circuit.

Configuration R8

The position detecting device according to Configuration R7, further including:

a transmitting coil of the EMR sensor; and a transmitting electrode of the touch sensor.

Configuration S1

A sensor for use in conjunction with an electronic apparatus that detects a position of a pen on a panel surface by electromagnetic induction action, the electronic apparatus including a display image generating layer that generates a display image according to control of a driving circuit, the sensor including:

a first electrode layer in which one or more first electrodes constituting a plurality of first coils arranged side by side in a first direction are arranged; and a second electrode layer in which one or more second electrodes constituting a plurality of second coils arranged side by side in a second direction intersecting the first direction are arranged, the second electrode layer being on an opposite side from a side provided with the first electrode layer with the display image generating layer as a center.

Configuration T1

A sensor for use in conjunction with an electronic apparatus that detects a position of a pen on a panel surface by electromagnetic induction action, the electronic apparatus including a display image generating layer that generates a display image according to control of a driving circuit, the sensor including:

a first electrode layer in which one or more first electrodes constituting a plurality of first coils arranged side by side in a first direction are arranged; and a second electrode layer in which one or more second electrodes constituting a plurality of second coils arranged side by side in a second direction intersecting the first direction are arranged, the one or more second electrodes being formed in one layer on one surface of the display image generating layer.

Configuration V1

A sensor for use in conjunction with an electronic apparatus that detects a position of a pen on a panel surface by electromagnetic induction action, the electronic apparatus including a display image generating layer that generates a display image according to control of a driving circuit, and a support plate disposed at a position more distant from the panel surface than the display image generating layer, the sensor including:

a first electrode layer in which one or more first electrodes constituting a plurality of first coils arranged side by side in a first direction are arranged; and a second electrode layer in which one or more second electrodes constituting a plurality of second coils arranged side by side in a second direction intersecting the first direction are arranged, the one or more first electrodes being formed on the support plate.

Configuration W1

A sensor for use in conjunction with an electronic apparatus that detects positions of a pen and a finger on a panel surface, the electronic apparatus including a display image generating layer that generates a display image according to control of a driving circuit, the sensor including a plurality of coil-shaped electrodes arranged between the panel surface and the display image generating layer, the plurality of coil-shaped electrodes each having a configuration formed by connecting respective first ends of two conductors extended in parallel with each other along a first direction to each other by a connecting wire extending in a second direction intersecting the first direction, and a conductor extended so as to be stretched in a region displaying the display image as viewed in plan view among the two conductors constituting each of the plurality of coil-shaped electrodes being formed by a mesh electrode or a transparent electrode.

Configuration X1

A display including:

a display image generating layer that generates a display image according to control of a driving circuit; and a sensor used to detect a position of a pen on a panel surface by electromagnetic induction action, the sensor including a first electrode layer in which one or more first electrodes constituting a plurality of first coils arranged side by side in a first direction are arranged, and a second electrode layer in which one or more second electrodes constituting a plurality of second coils arranged side by side in a second direction intersecting the first direction are arranged, the second electrode layer being on an opposite side from a side provided with the first electrode layer with the display image generating layer as a center.

Configuration Y1

A display including:

a display image generating layer that generates a display image according to control of a driving circuit; and a sensor used to detect a position of a pen on a panel surface by electromagnetic induction action, the sensor including a first electrode layer in which one or more first electrodes constituting a plurality of first coils arranged side by side in a first direction are arranged, and a second electrode layer in which one or more second electrodes constituting a plurality of second coils arranged side by side in a second direction intersecting the first direction are arranged, and the one or more second electrodes being formed in one layer on one surface of the display image generating layer.

Configuration Z1

A display including:

a display image generating layer that generates a display image according to control of a driving circuit;

a sensor used to detect a position of a pen on a panel surface by electromagnetic induction action; and a support plate disposed at a position more distant from the panel surface than the display image generating layer, the sensor including a first electrode layer in which one or more first electrodes constituting a plurality of first coils arranged side by side in a first direction are arranged, and a second electrode layer in which one or more second electrodes constituting a plurality of second coils arranged side by side in a second direction intersecting the first direction are arranged, and the one or more first electrodes being formed on the support plate.

Configuration AA1

A display including:

a display image generating layer that generates a display image according to control of a driving circuit; and a sensor used to detect a position of a pen on a panel surface by electromagnetic induction action, the sensor including a plurality of coil-shaped electrodes arranged between the panel surface and the display image generating layer, the plurality of coil-shaped electrodes each having a configuration formed by connecting respective first ends of two conductors extended in parallel with each other along a first direction to each other by a connecting wire extending in a second direction intersecting the first direction, and a conductor extended so as to be stretched in a region displaying the display image as viewed in plan view among the two conductors constituting each of the plurality of coil-shaped electrodes being formed by a mesh electrode or a transparent electrode.

Preferred embodiments of the present disclosure have been described above. However, the present disclosure is not at all limited to such embodiments, and it is needless to say that the present disclosure can be carried out in various modes without departing from the spirit of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A position detecting device for detecting a position of a pen on a foldable panel surface by electromagnetic induction, the position detecting device comprising:

a first electrode layer in which one or more first electrodes constituting a plurality of first coils arranged side by side in a first direction are arranged, wherein the one or more first electrodes are formed in a single layer;

wherein the one or more first electrodes form a comb-shaped coil having a configuration in which a plurality of tooth portions extending in a second direction intersecting the first direction are connected at one end to a base extending in the first direction;

wherein the comb-shaped coil includes a first comb-shaped coil provided on a first side of a bending axis of a display including a display image generating layer that, in operation, generates a display image according to control by a drive circuit, and a second comb-shaped coil provided on a second side of the bending axis;

wherein the first comb-shaped coil includes a first portion of the base on the first side of the bending axis;

wherein the second comb-shaped coil includes a second portion of the base on the second side of the bending axis; and wherein the first portion of the base and the portion of the base are connected to each other by a connecting conductor extending across the bending axis.

2. The position detecting device according to claim 1, wherein the connecting conductor is made of a material different from that of the base.

3. The position detecting device according to claim 2, wherein the material is less prone to breakage due to bending operations than the base.

4. The position detecting device according to claim 1, wherein the connection conductor is formed with a structure different from that of the base.

5. The position detecting device according to claim 4, wherein the structure is less prone to breakage due to bending operations than the base.

6. The position detecting device according to claim 1, further comprising:

a second electrode layer on the side opposite to the side on which the first electrode layer is provided, with one or more second electrodes that constitute a plurality of second coils arranged in the second direction.

7. The position detecting device according to claim 6, wherein the position detecting device, in operation, transmits an alternating magnetic field from the first electrodes, and detects a pen alternating magnetic field generated by the pen that accumulates electrodes due to the alternating magnetic field using the second electrodes.

8. The position detecting device according to claim 7, wherein the one or more second electrodes are provided on a panel surface side of the display image generating layer and include a transparent portion formed of a transparent conductor.

9. The position detecting device according to claim 1, wherein, in operation, an alternating magnetic field is emitted from the first electrodes.

10. The position detecting device according to claim 1, further comprising:

a support plate, wherein the one or more first electrodes are formed on one surface of the support plate.

11. The position detecting device according to claim 10, wherein the first electrode layer has a plurality of pads connected to an external substrate, and the plurality of pads are formed on one surface of the support plate.

* * * * *